(12) United States Patent
Filoti et al.

(10) Patent No.: US 11,120,062 B2
(45) Date of Patent: Sep. 14, 2021

(54) FRAMEWORK FOR ANALYZING GRAPHICAL DATA BY QUESTION ANSWERING SYSTEMS

(71) Applicant: INTERNATIONAL BUSINESS MACHINES CORPORATION, Armonk, NY (US)

(72) Inventors: Octavian F. Filoti, Portsmouth, NH (US); Chengmin Ding, Chantilly, VA (US); Stanley J. Vernier, Grove City, OH (US); Renee F. Decker, Brunswick, MD (US); Elinna Shek, Aldie, VA (US)

(73) Assignee: International Business Machines Corporation, Armonk, NY (US)

( * ) Notice: Subject to any disclaimer, the term of this patent is extended or adjusted under 35 U.S.C. 154(b) by 362 days.

(21) Appl. No.: 16/241,460

(22) Filed: Jan. 7, 2019

(65) Prior Publication Data
US 2020/0218745 A1 Jul. 9, 2020

(51) Int. Cl.
*G06F 16/00* (2019.01)
*G06F 16/338* (2019.01)
*G06N 5/00* (2006.01)
*G06F 16/31* (2019.01)
*G06F 16/332* (2019.01)
(Continued)

(52) U.S. Cl.
CPC ......... *G06F 16/338* (2019.01); *G06F 16/316* (2019.01); *G06F 16/3329* (2019.01); *G06N 5/00* (2013.01)

(58) Field of Classification Search
CPC ............. G06F 16/2282; G06F 16/9535; G06F 16/338; G06F 16/316; G06F 16/332; G06N 5/04
See application file for complete search history.

(56) References Cited

U.S. PATENT DOCUMENTS 6,289,513 B1 * 9/2001 Bentwich .................. G06F 8/30
717/106
9,430,557 B2 8/2016 Bhat et al.
(Continued)

FOREIGN PATENT DOCUMENTS

CN 107741943 A 2/2018

OTHER PUBLICATIONS

Khalid et al., "Machine Learning for Question Answering from Tabular Data", 18th International Workshop on Database and Expert Systems Applications, 2007, IEEE, pp. 392-396. (Year: 2007).*
(Continued)

*Primary Examiner* — Cheryl Lewis
(74) *Attorney, Agent, or Firm* — Conley Rose, P.C.

(57) ABSTRACT

A system for handling a graphical representation of data associated with a question answering (QA) input document includes a memory having instructions therein and includes at least one processor in communication with the memory. The at least one processor is configured to execute the instructions to derive, at least from a portion of the QA input document, first metadata regarding a context of the graphical representation of data. The at least one processor is also configured to execute the instructions to derive, at least from a portion of the graphical representation of data, tabular data. The at least one processor is also configured to execute the instructions to determine, at least in part by comparing at least a portion of the first metadata to existing table annotations from a QA knowledge base, how to incorporate the tabular data into the QA knowledge base.

20 Claims, 11 Drawing Sheets

(56) References Cited

U.S. PATENT DOCUMENTS

| | | | |
|---|---|---|---|
| 9,495,387 B2 | 11/2016 | Ahuja et al. | |
| 9,727,637 B2 * | 8/2017 | Visotski | G06F 16/3329 |
| 9,910,901 B2 | 3/2018 | Brainerd et al. | |
| 9,965,705 B2 | 5/2018 | Chen et al. | |
| 10,437,890 B2 * | 10/2019 | Bastide | G06F 40/166 |
| 2015/0142418 A1 * | 5/2015 | Byron | G06F 40/232 704/9 |
| 2015/0235106 A1 | 8/2015 | Kraeling et al. | |
| 2016/0364374 A1 | 12/2016 | O'Connor et al. | |
| 2018/0157990 A1 * | 6/2018 | Allen | G06F 16/9535 |

OTHER PUBLICATIONS

Yih et al., "The Value of Semantic Parse Labeling for Knowledge Base Question Answering", Proceedings of the 54th Annual Meeting of the Association for Computational Linguistics, pp. 201-206. (Year: 2016).*

West et al., "Knowledge Base Completion via Search-Based Question Answering", WWW'14, ACM Apr. 7-11, 2014.*

Poco, et al., "Reverse-Engineering Visualizations: Recovering Visual Encodings from Chart Images," https: idl.cs.washington.edu/files/2017-ReverseEngineeringVis-Euro-Vis.pdf, Eurographics Conference on Visualization (EuroVis) 2017, vol. 36, No. 3, 11 pages.

Dubin, "The Most Influential Paper Gerard Salton Never Wrote," https://www.ideals.illinois.edu/bitstream/handle/2142/1697/Dubin748764.pdf, Library Trends, vol. 52, No. 4, Spring 2004, pp. 748-764.

Goyal, et al., "Graph Embedding Techniques, Applications, and Performance: A Survey," arXiv:1705.02801, Social and Information Networks, Knowledge Based Systems, vol. 151, Jul. 1, 2018, pp. 78-94, 2018.

Anonymously, "Interpreting Complex Graphs for Optimal Ingestion," IPCOM000241711D, May 26, 2015, 3 pages.

* cited by examiner

US 11,120,062 B2

FRAMEWORK FOR ANALYZING GRAPHICAL DATA BY QUESTION ANSWERING SYSTEMS

BACKGROUND

A question answering (QA) system is a computer application which mines stored data in a knowledge base in order to answer questions. The present disclosure provides embodiments for utilizing graphical data in a QA system such as, but not limited to, the Watson® QA system available from IBM®.

SUMMARY

A method for handling a graphical representation of data associated with a QA input document is disclosed. The method includes deriving, at least from a portion of the QA input document, first metadata regarding a context of the graphical representation of data. The method also includes deriving, at least from a portion of the graphical representation of data, tabular data. The method also includes determining, at least in part by comparing at least a portion of the first metadata to existing table annotations from a QA knowledge base, how to incorporate the tabular data into the QA knowledge base. The method also includes storing the tabular data in the QA knowledge base.

A system for handling a graphical representation of data associated with a QA input document is disclosed. The system includes a memory having instructions therein and includes at least one processor in communication with the memory. The at least one processor is configured to execute the instructions to derive, at least from a portion of the QA input document, first metadata regarding a context of the graphical representation of data. The at least one processor is also configured to execute the instructions to derive, at least from a portion of the graphical representation of data, tabular data. The at least one processor is also configured to execute the instructions to determine, at least in part by comparing at least a portion of the first metadata to existing table annotations from a QA knowledge base, how to incorporate the tabular data into the QA knowledge base. The at least one processor is also configured to execute the instructions to store the tabular data in the QA knowledge base.

A computer program product for handling a graphical representation of data associated with a QA input document is disclosed. The computer program product includes a computer readable storage medium having program instructions embodied therewith. The program instructions are executable by at least one processor to cause the at least one processor to derive, at least from a portion of the QA input document, first metadata regarding a context of the graphical representation of data. The program instructions are also executable by the at least one processor to cause the at least one processor to derive, at least from a portion of the graphical representation of data, tabular data. The program instructions are also executable by the at least one processor to cause the at least one processor to determine, at least in part by comparing at least a portion of the first metadata to existing table annotations from a QA knowledge base, how to incorporate the tabular data into the QA knowledge base. The program instructions are also executable by the at least one processor to cause the at least one processor to store the tabular data in the QA knowledge base.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

Figure 1:
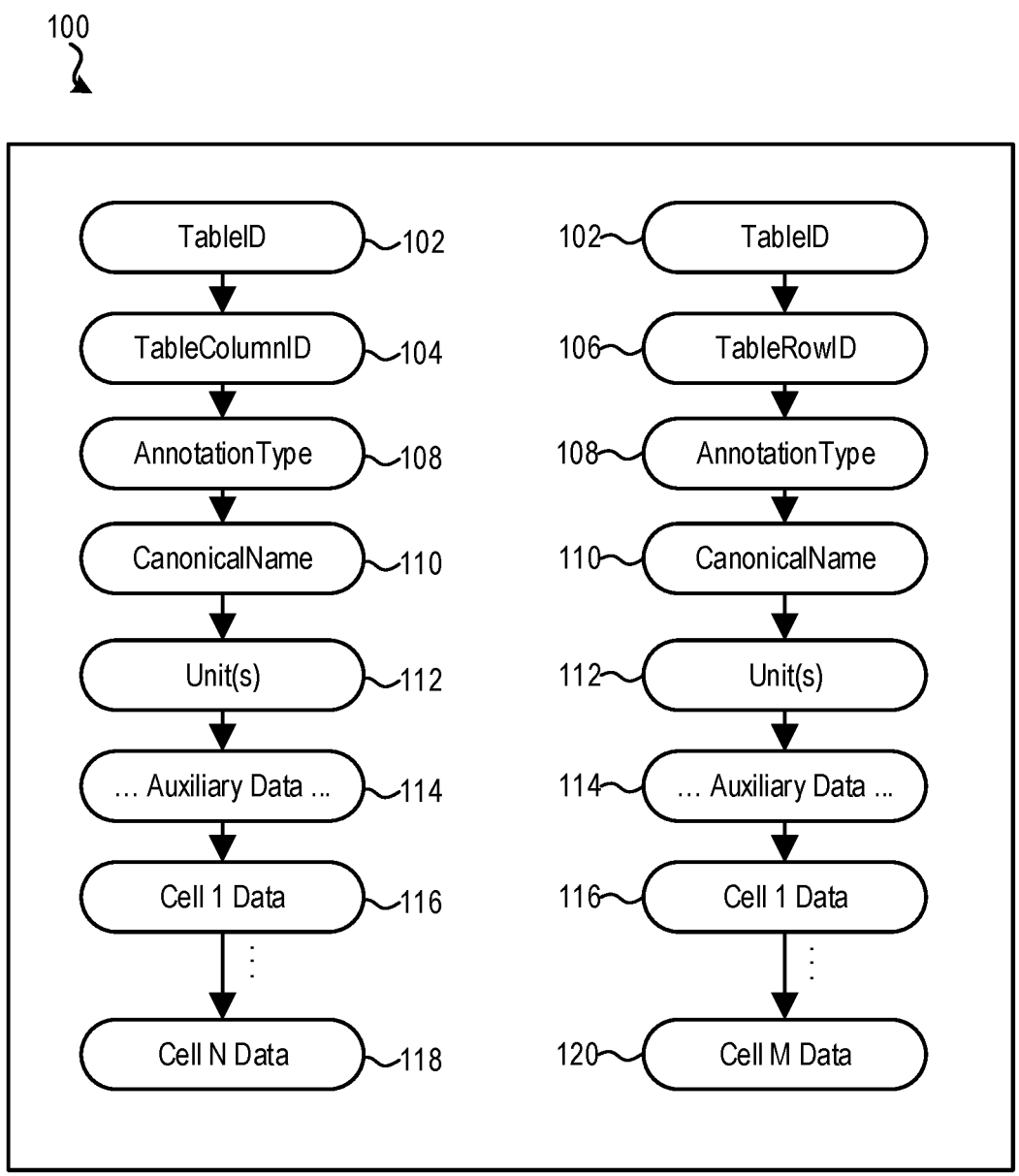
FIG. 1 is a block diagram illustrating a first representation of table annotations in accordance with aspects of the present disclosure.

The illustrated figures are only exemplary and are not intended to assert or imply any limitation with regard to the environment, architecture, design, or process in which different embodiments may be implemented.

DETAILED DESCRIPTION

It should be understood at the outset that, although an illustrative implementation of one or more embodiments are provided below, the disclosed systems, computer program product, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used within the written disclosure and in the claims, the terms "including" and "comprising" are used in an open-ended fashion, and thus should be interpreted to mean "including, but not limited to." Unless otherwise indicated, as used throughout this document, "or" does not require mutual exclusivity, and the singular forms "a," "an," and "the" are intended to include the plural forms as well, unless the context clearly indicates otherwise.

A module or unit as referenced herein may comprise one or more hardware or electrical components such as electrical circuitry, processors, and memory that may be specially configured to perform a particular function. The memory may be volatile memory or non-volatile memory that stores data such as, but not limited to, computer executable instructions, machine code, and other various forms of data. The module or unit may be configured to use the data to execute one or more instructions to perform one or more tasks. In certain instances, a module may also refer to a particular set of functions, software instructions, or circuitry that is configured to perform a specific task. For example, a module may be comprised of software components such as, but not limited to, data access objects, service components, user interface components, application programming interface (API) components; hardware components such as electrical circuitry, processors, and memory; and/or a combination thereof. As referenced herein, computer executable instructions may be in any form including, but not limited to, machine code, assembly code, and high-level programming code written in any programming language.

Also, as used herein, the term "communicate" means to send and/or receive data over a communication link. The communication link may include both wired and wireless links, and may be a direct link or may comprise multiple links passing through one or more communication networks or network devices such as, but not limited to, routers, firewalls, servers, and switches. The communication networks may be any type of wired or wireless network. The networks may include private networks and/or public networks such as the Internet. Additionally, in some embodiments, the term communicate may also encompass internal communication between various components of a system and/or with an external input/output device such as a keyboard or display device.

Graphical data is data that is expressed by a graphical representation, e.g., by a chart or graph. An abundance of information may be conveyed by graphical data. However, analyzing graphical data has been challenging for QA systems. The present disclosure is related to integrating graphical data and contextual data regarding the graphical data into a QA system such that the QA system may be able to directly or indirectly (i.e., infer) answers from the graphical data as well as from general text, potentially expanding the capabilities of the QA system beyond the quest that the answer has to be in its knowledge base. Being able to leverage graphical data in domains where it contains hidden insights (e.g., a scientific domain or financial domain) provides the potential to discover facts from the hidden context and improve the accuracy of answers.

In accordance with aspects of the present disclosure, tabular data is derived from graphical data and one or more table annotations are created that link data regarding the context of graphical data to the graphical data. In accordance with aspects, semantic meanings of the contextual data and semantic meanings of text from a document associated with the graphical data are associated with the table annotation(s). In accordance with aspects, the table annotation(s) are stored in, a search index, a relational database collection, or both. And the search index or relational database collection may be used by the QA system (independent of or together with the general text ingested data) to retrieve table information for obtaining answers to a question. Advantages of aspects of the present disclosure include, but are not limited to, enhanced capabilities to infer facts, improved answer accuracy, and capabilities to retrieve graphical data using multiple values, such as annotation type, canonical name, unit, and cell data, or any auxiliary metadata that was attached to the link, and expanded capabilities to answer more complex questions.

Figure 2:
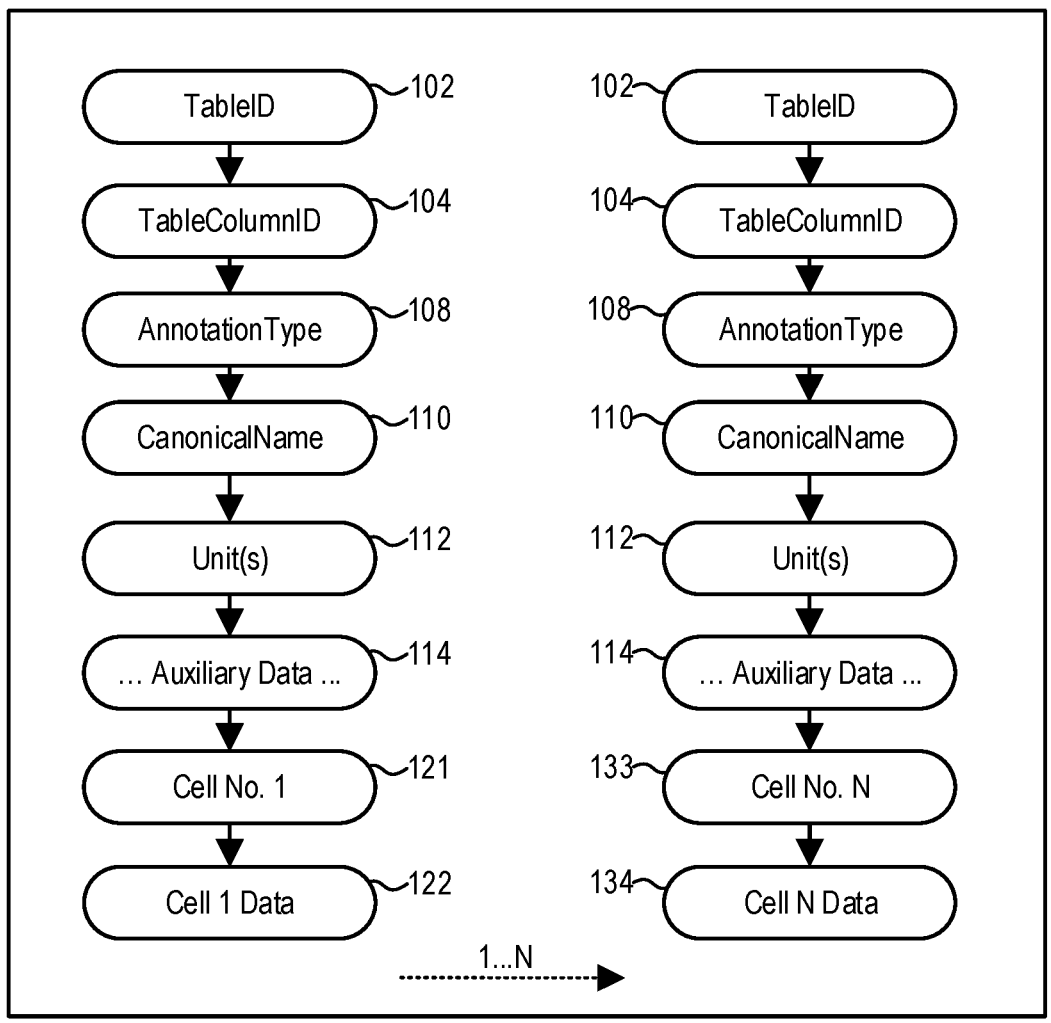
FIG. 2 is a block diagram illustrating a second representation of table annotations in accordance with aspects of the present disclosure.

FIG. 1 and FIG. 2 are block diagrams illustrating a first representation of table annotations 100 and a second representation of table annotations 200 in accordance with various embodiments of the present disclosure. It should be appreciated that the table annotations 100 depicted in FIG. 1 may be used for relational databases that have tables with N rows and M columns, and the table annotations 200 depicted in FIG. 2 may be used for a search index collection. In accordance with aspects of the present disclosure, the graphics ingestion pipeline 400 (depicted in FIG. 4) may generate table annotations in either or both of the forms represented by the table annotations 100 and the table annotations 200, respectively. In accordance with aspects of the present disclosure, the table ingestion pipeline 300 (depicted in FIG. 3) may also generate the table annotations 380 in either or both of the forms represented by the table annotations 100 and the table annotations 200, respectively. As described below, the QA system 500 (depicted in FIG. 5) may use the table annotations 100 and/or the table annotations 200 to analyze table information for answering questions.

Referring to FIG. 1, the table annotations 100 links the table identifier (TableID) 102 with a table column ID (TableColumnID) 104. The TableID 102 is a unique identifier for each table that is represented by a set of table annotations. For example, the TableID 102 may comprise a document number, table name, and the table number within the document (when more than one set of table annotations represent more than one respective tables from/in a document). The TableColumnID 104 is a column normalized position (e.g., column position normalized to a position of a baseline column). Similarly, when the table has row headers, the table annotations 100 may link the TableID 102 with a table row ID (TableRowID) 106. The TableRowID 106 is a row normalized position. The TableColumnID 104 and/or the TableRowID 106 are linked to an annotation type (AnnotationType) 108. AnnotationType 108 is a description or semantic meaning of the column or row header. For example, depending on the natural processing engine used on the table, a semantic meaning is assigned to the column or row header, such as PERSON, ORGANIZATION, TIME, TEMPERATURE, etc.

The AnnotationType 108 is linked to a canonical name (CanonicalName) 110, which is a canonical form of the column or row header data. For example, when the column or row header data is abbreviated or too complex, then the header data is reduced or expanded to a canonical (normalized) form. The CanonicalName 110 is linked to Unit(s) 112. Unit(s) 112 indicates whether there is a unit of measurement for that column or row. In accordance with aspects of the present disclosure, when there is a unit of measurement for that column or row, then either a symbol or a normalized (canonical) form of the unit is shown. For example, when F is the unit, then either the symbol F is used or a canonical form such as Fahrenheit may be used. In some instances, there could also be multiple units used, such as F (C).

The Unit(s) 112 is linked to any Auxiliary Data 114 for the column/row of the table. Auxiliary Data 114 may be any type of data that may assist in analyzing the table data, or it may be a plurality of fields (Auxiliary Data 1, Auxiliary Data2, . . . ). For example, Auxiliary Data 114 may include additional metadata or semantic meaning that helps in analyzing the table data, or it could be a list of attributes as discussed further below. The Auxiliary Data 114 is linked to the cell data beginning with the data in cell 1 (Cell 1 Data) 116 through the data in cell N (Cell N Data) 118 for the corresponding column header, and through the data in cell M (Cell M Data) 120 for the corresponding row header.

Referring to FIG. 2, the table annotations 200 are similar to the table annotations 100 described above, except that they are optimized for use in a search index collection. In particular, the table annotations 200 link the TableID 102, TableColumnID 104, AnnotationType 108, CanonicalName 110, Unit(s) 112, Auxiliary Data 114, and Cell No. N (e.g., 1, 2, 3, . . . ) 133 with only one Cell N Data (e.g., the data in cell 1, the data in cell 2, the data in cell 3, . . . ). In the instance of a table that has N cells, there will be N sets of table annotations, the first set containing the TableID 102, TableColumnID 104, AnnotationType 108, CanonicalName 110, Unit(s) 112, Auxiliary Data 114, Cell No. 1 121, and Cell 1 Data 122, and the last set containing the TableID 102, TableColumnID 104, AnnotationType 108, CanonicalName 110, Unit(s) 112, Auxiliary Data 114, Cell No. N 133, and Cell N Data 134. In accordance with aspects of the present disclosure, to obtain the data for a particular cell X, the QA system 500 will loop through the search index X times to retrieve the desired cell data as further described below.

Figure 3:
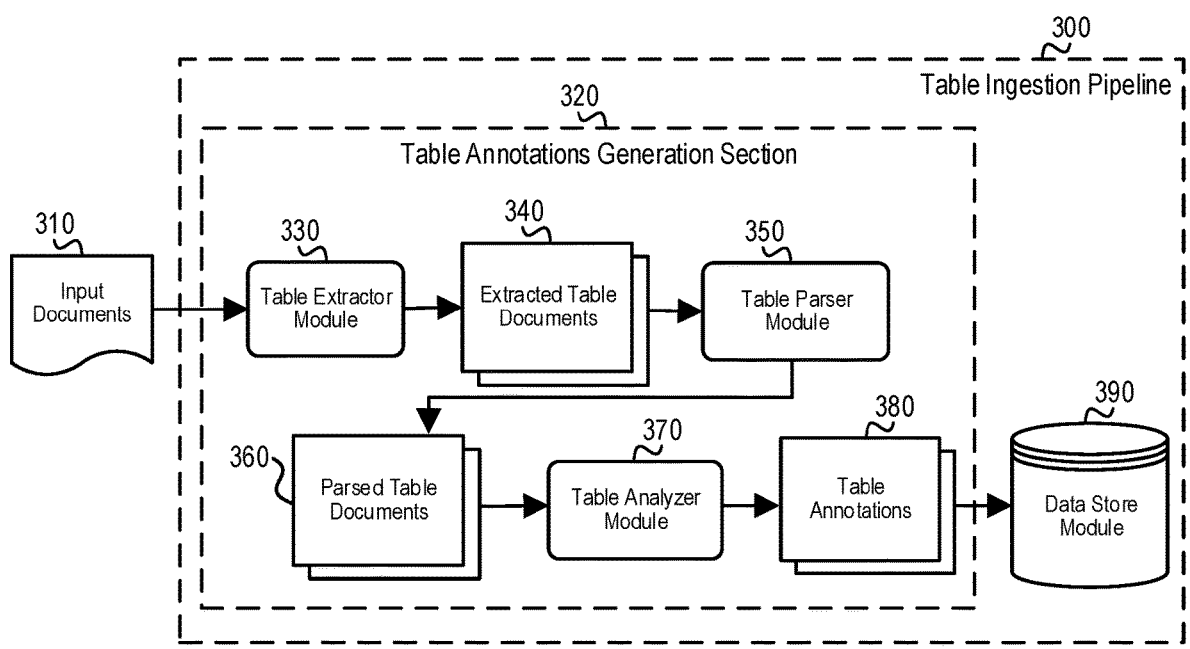
FIG. 3 is a block diagram illustrating a table ingestion pipeline that is configured to ingest a set of input documents including table data and produce table annotations in accordance with aspects of the present disclosure.

FIG. 3 is a block diagram illustrating a table ingestion pipeline 300 that is configured to ingest a set of input documents 310 including table data and produce table annotations 380 in accordance with aspects of the present disclosure. In accordance with aspects of the present disclosure, the table ingestion pipeline 300 is a component of a larger QA system ingestion pipeline 520 (depicted in FIG. 5) that is configured to extract information from source documents to create a knowledge base that is used by a QA system 500 (depicted in FIG. 5) to answer questions. The set of input documents 310 may include any number of documents that may contain tables as well as unstructured text, and the set of input documents 310 may include, but is not limited to, user created documents, online web pages gathered by a web crawler, table data, and data from other databases. The knowledge base may store complex structured and unstructured information. Structured information is data that has some form of organization, whereas unstructured information is unorganized information. In accordance with aspects of the present disclosure, the table ingestion pipeline 300 is configured to extract table data from the set of input documents 310 and to build table annotations that are stored in a search index and/or relational database collection, and may generate the table annotations 380 in either or both of the forms represented by the table annotations 100 and the table annotations 200, respectively. In the depicted example, the table ingestion pipeline 300 includes a table annotations generation section 320.

In accordance with aspects of the present disclosure, the set of input documents 310 is received as input into a table extractor module 330, which separates the tables in the set of input documents 310 to create extracted table documents 340 that contain only the tables from the set of input documents 310. When the set of input documents 310 contains only tables, the table extractor module 330 may be eliminated.

In the depicted example, the extracted table documents 340 are received by a table parser module 350, which parses the table structure and creates parsed table documents 360 that identify the table headers and their corresponding cells data. The table parser module 350 discards extra attributes such as, but not limited to, formatting and style, and maintains only the table data of interest. In accordance with aspects of the present disclosure, different table formats may be parsed and converted to a particular format such as, but not limited to, hypertext markup language (HTML) format.

In accordance with aspects of the present disclosure, the table parser module 350 records the position of each cell in the table such as its rows and columns headers or other identifiers (IDs).

In the depicted example, the parsed table documents 360 are received by a table analyzer module 370. In accordance with aspects of the present disclosure, the table analyzer module 370 is a natural language processing (NLP) engine that is adapted for table analysis. In accordance with aspects of the present disclosure, the table analyzer module 370 performs NLP on the header and its cells data to identify the header's annotation type or category (e.g., Person, Organization, Date, Temperature), extract unit of measurement information when available, and/or determine any other semantic value that could be useful. In accordance with aspects of the present disclosure, the table analyzer module 370 normalizes the header or cell data to a canonical form that accounts for variations in the data such as plural/singular terms, past/present tense, misspellings, abbreviations, etc. In the depicted example, the table analyzer module 370 produces the table annotations 380. Among other things, the table annotations 380 link the headers with their corresponding cells data along with semantic values. The semantic values are the result of the table analyzer module 370 performing its NLP on each table cell data, and they could be, for example, the annotation types, categories or labeling. Besides the annotation types, the extra semantic values may make up the Auxiliary Data 114 (described above). In accordance with aspects of the present disclosure, the table annotations 380 will be used by the QA system 500 (depicted in FIG. 5) for answering questions in which the answer may be found directly or indirectly in the table data as further described herein.

In the depicted example, the table annotations 380 are stored in a data store module 390 that is configured to receive and store new table annotations, and that is further configured to retrieve (from storage) and output existing table annotations. In accordance with aspects of the present disclosure, the data store module 390 is a repository for persistently storing and managing collections of data, and may store and manage a search index and/or relational database collection. In the depicted example, the data store module 390 is communicatively coupled to the data store module 440 (depicted in FIG. 4; see also the QA system 500 depicted in FIG. 5) and is part of the knowledge base of the QA system 500 (depicted in FIG. 5) that contains the information or data that is available to the QA system 500 for answering questions. Alternatively, the data store module 390 may be integrated with the data store module 440.

Figure 4:
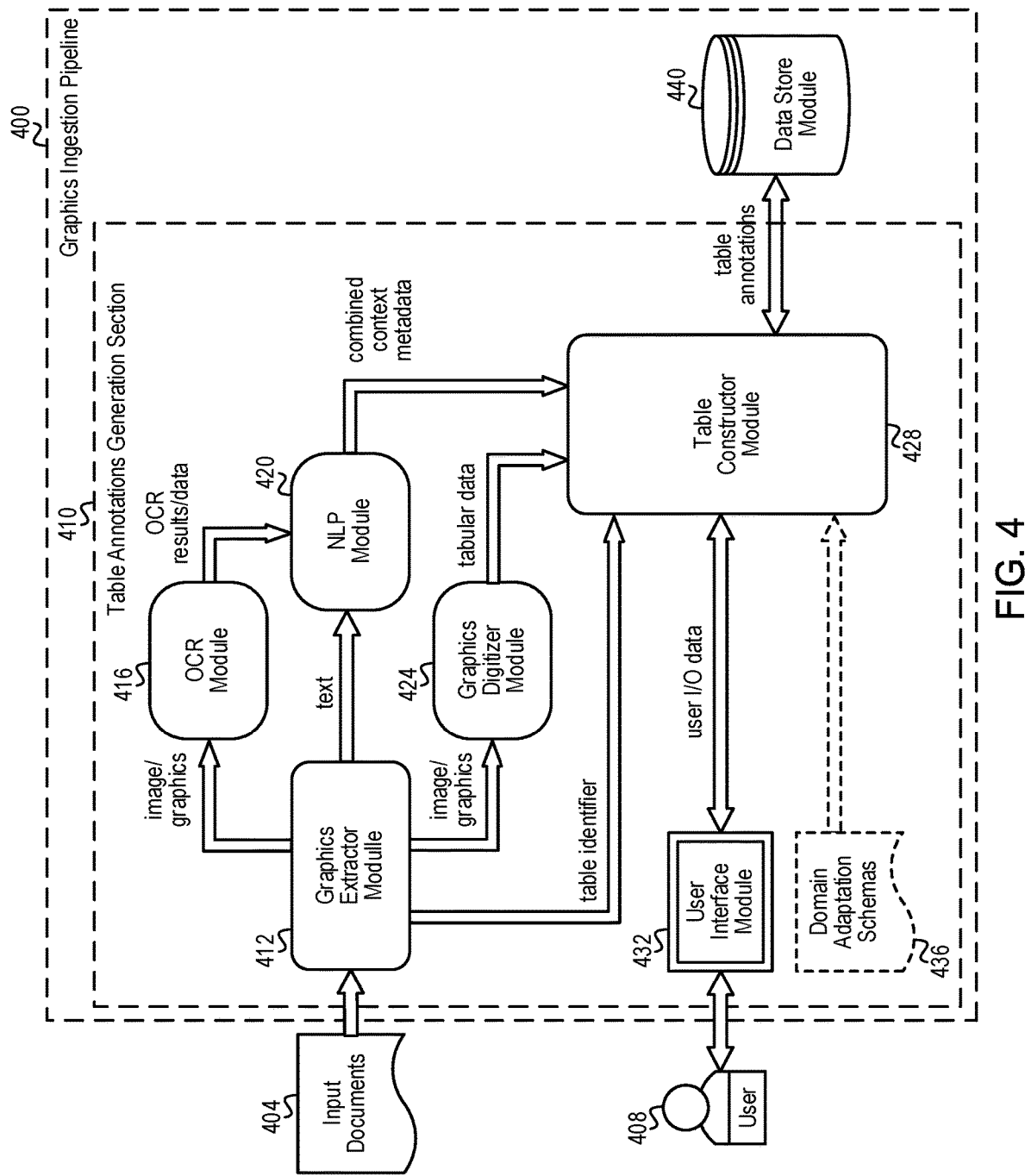
FIG. 4 is a block diagram illustrating a graphics ingestion pipeline that is configured to ingest a set of input documents including a graphical representation of data, interface with a user, and produce table annotations in accordance with aspects of the present disclosure.

FIG. 4 is a block diagram illustrating a graphics ingestion pipeline 400 that is configured to ingest a set of input documents 404 including a graphical representation of data, interface with a user 408, and produce table annotations in accordance with aspects of the present disclosure. In accordance with aspects of the present disclosure, the graphics ingestion pipeline 400 is a component of a larger QA system ingestion pipeline 520 (depicted in FIG. 5) that is configured to extract information from input documents to create a knowledge base that is used by a QA system 500 (depicted in FIG. 5) to answer questions. The set of input documents 404 may include any number of documents containing a graphical representation of data and structured and/or unstructured text, and the set of input documents 404 may include, but need not be limited to, user created documents, online web pages gathered by a web crawler, and data from other databases. The knowledge base may store structured and unstructured information. Structured information is data that has some form of organization, whereas unstructured information is unorganized information. In accordance with aspects of the present disclosure, the graphics ingestion pipeline 400 is configured to produce table annotations in a form suitable for storage in a search index collection and/or in a form suitable for storage in a relational database collection, and may generate table annotations in either or both of the forms represented by the table annotations 100 and the table annotations 200, respectively. In the depicted example, the graphics ingestion pipeline 400 includes a table annotations generation section 410.

In accordance with aspects of the present disclosure, the graphics ingestion pipeline 400 includes a graphics extractor module 412. The graphics extractor module 412 is configured to receive the set of input documents 404, to separate the graphical representation of data (i.e., the image/graphics) included in the set of input documents 404 from the associated structured and/or unstructured text passages, to generate a document unique table identifier (TableID) 102 (depicted in FIG. 1), to output the graphical representation of data, to output the TableID 102, and to output the structured and/or unstructured text. As noted above in connection with FIG. 1, the TableID 102 is a unique identifier for each table that is represented by a set of table annotations. The graphics extractor module 412 may be implemented using features of free or commercially available APIs or other tools such as, for example, for PDF graphics extraction, features available from PDF Tools AG (at http://www.pdf-tools.com/pdf20) or PDFaid (at https://www.pdfaid.com/ExtractImages.aspx), for PNG graphics extraction, features available from Online PNG Tools (at https://onlinepngtools.com/), and/or for web page metadata extraction, features available from the URL Meta API (at https://urlmeta.org/). Or the graphics extractor module 412 may be implemented using any other suitable system or device.

The example graphics ingestion pipeline 400 further includes an optical character recognition (OCR) module 416. The OCR module 416 is communicatively coupled to the graphics extractor module 412. In accordance with aspects of the present disclosure, the OCR module 416 is configured to receive the graphical representation of data from the graphics extractor module 412, to use OCR to identify whatever axes labels, units, and/or titles, and whatever other information that is optically recognizable from the graphical representation of data, to generate corresponding OCR results/data that describes or otherwise represents the optically recognizable information, and to output the OCR results/data. In accordance with aspects of the present disclosure, the OCR module 416 is further configured to normalize the units and to include the normalized units in the OCR results/data. The OCR module 416 may be implemented using features of the ABBYY® FineReader tools (at https://www.abbyy.store), features of the ABBYY® Cloud OCR SDK tools (at https://www.ocrsdk.com), features of the Esker Image Recognition Module (at https://www.esker.com/cloud-technologies/OCR/), and/or features of the free online APIs from Smart Soft (at http://www.free-online-ocr.com/) or Convertio (at https://convertio.co/ocr/). Or the OCR module 416 may be implemented using any other suitable system or device.

The example graphics ingestion pipeline 400 further includes a natural language processing (NLP) module 420. The NLP module 420 is communicatively coupled to the graphics extractor module 412 and communicatively coupled to the OCR module 416. In accordance with aspects of the present disclosure, the NLP module 420 is configured to receive the structured and/or unstructured text, to receive the OCR results/data, to use NLP to derive, from the structured and/or unstructured text, context metadata, in the form of a list (such as, for example: {Watersports, Weather, Location} or {Housing Market, Price}) that describes the topics and/or other contexts of the graphical representation of data. Further, the NLP module 420 is configured to use NLP to derive, from the OCR results/data, additional context metadata, also in the form of a list (such as, for example: {Watersports, Weather, Location} or {Housing Market, Price}) that describes some topics and/or other contexts of the graphical representation of data. The NLP module 420 is also configured to generate combined context metadata, also in the form of a list (such as, for example: {Watersports, Weather, Location} or {Housing Market, Price}) that describes the topics and/or other contexts of the graphical representation of data, by combining the context metadata that it derives from the structured and/or unstructured text with the additional context metadata that it derives from the OCR results/data. And the NLP module 420 is configured to output the combined context metadata. The NLP module 420 may be specially implemented for processing the data from the graphics extractor module 412 and the OCR module 416 into one or more of these lists of attributes/metadata specific for each graphical image. Additionally, it should be appreciated that there is a wealth of similar free NLP software available online, such as Apache Open NLP (at http://opennlp.apache.org/), that may be suitably tweaked/adjusted to implement the NLP module 420. Also, it is noted that IBM® has used XSG internally as an NLP engine. It should be appreciated that the corresponding API may be wrapped to provide a suitable implementation of the NLP module 420. Or the NLP module 420 may be implemented using any other suitable system or device.

The example graphics ingestion pipeline 400 also includes a graphics digitizer module 424. The graphics digitizer module 424 is communicatively coupled to the graphics extractor module 412. In accordance with aspects of the present disclosure, the graphics digitizer module 424 is configured to receive the graphical representation of data, to digitize the graphical representation of data to generate tabular data corresponding to the graphical representation of data, and to output the tabular data. The graphics digitizer module 424 may be specially implemented, and/or may be implemented using features of free online software such as WebPlotDigitizer (at https://automeris.io/WebPlotDigitizer), such as "the online graphreader tool" (at http://www.graphreader.com/), or such as Plot Digitizer (at http://plotdigitizer.sourceforge.net/). Or the graphics digitizer module 424 may be implemented using any other suitable system or device.

In the depicted example, the graphics ingestion pipeline 400 also includes a table constructor module 428. The table constructor module 428 is communicatively coupled to the NLP module 420, communicatively coupled to the graphics digitizer module 424, communicatively coupled to the graphics extractor module 412, communicatively coupled to a user interface module 432, communicatively coupled to a source of domain adaptation schemas 436, and communicatively coupled to a data store module 440. In accordance with aspects of the present disclosure, the table constructor module 428 is configured to receive the combined context metadata, to receive the tabular data, to receive the TableID 102 (depicted in FIG. 1), to receive and output user input and output (I/O) data, to receive domain adaptation schemas, to receive existing table annotations, and to generate new table annotations (as described further below).

The example graphics ingestion pipeline 400 also includes the user interface module 432. In accordance with aspects of the present disclosure, the user interface module 432 is configured to receive I/O data and generate corresponding visual and/or audible information for the user 408, and is further configured to receive input from the user 408, to generate corresponding I/O data in response to the user input, and to output the corresponding I/O data.

The example graphics ingestion pipeline 400 also includes a data store module 440 that is communicatively coupled to the table constructor module 428. The data store module 440 is configured to receive and store new table annotations, and is further configured to retrieve (from storage) and output existing table annotations. In accordance with aspects of the present disclosure, the data store module 440 is a repository for persistently storing and managing collections of data, and may store and manage a search index and/or relational database collection. In accordance with aspects of the present disclosure, the data store module 440 is communicatively coupled to the data store module 390 (depicted in FIG. 3; see also the QA system 500 depicted in FIG. 5) and is part of the knowledge base of the QA system 500 (depicted in FIG. 5) that contains the information or data that is available to the QA system 500 for answering questions. In accordance with aspects of the present disclosure, the data store module 440 may be integrated with the data store module 390.

Figure 5:
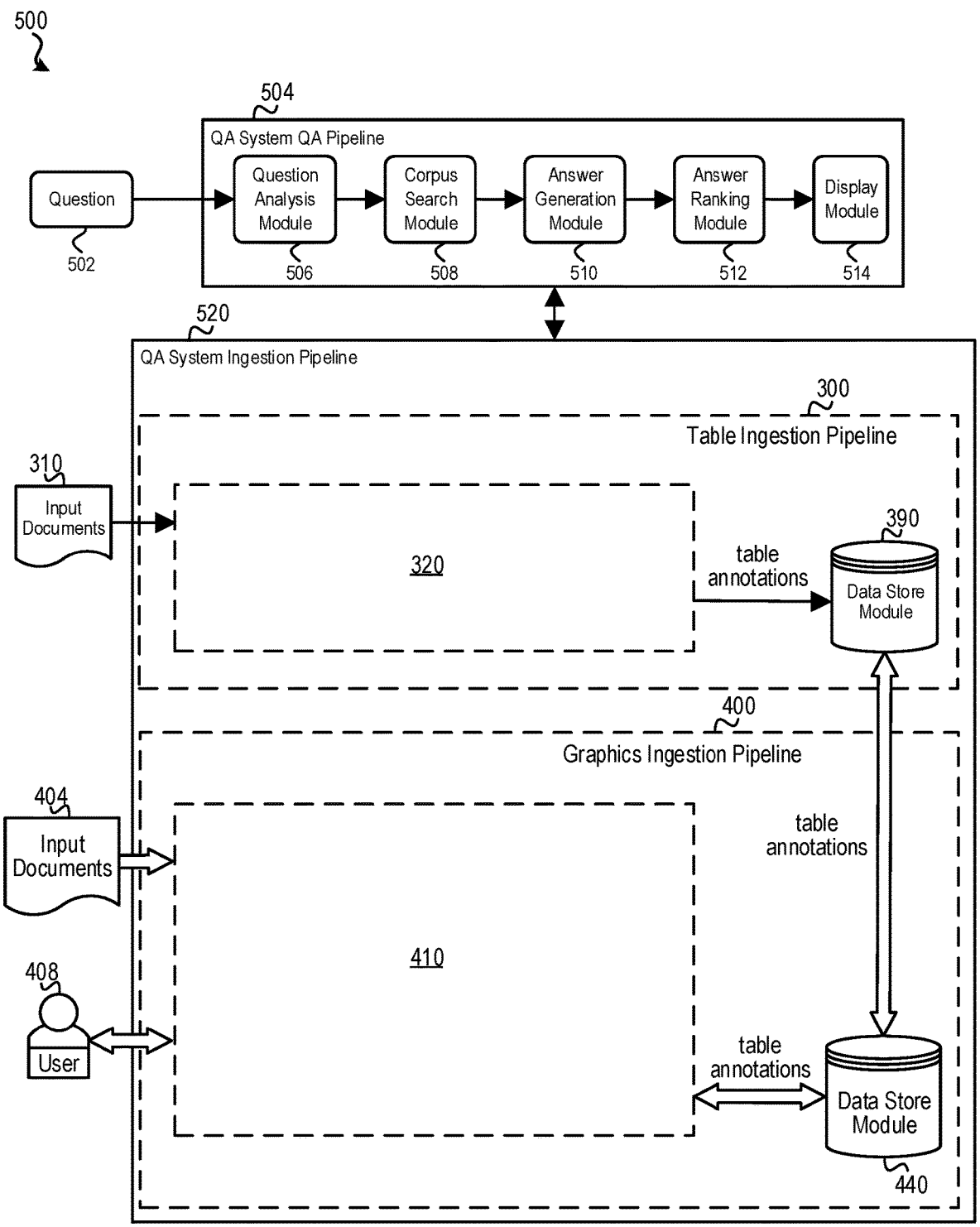
FIG. 5 is a block diagram illustrating a QA system in accordance with aspects of the present disclosure.

FIG. 5 is a block diagram illustrating a QA system 500 in accordance with aspects of the present disclosure. In the depicted example, the QA system 500 includes a QA system QA pipeline 504 and includes a QA system ingestion pipeline 520 that is configured to create a knowledge base by extracting information from input documents. The input documents may include unstructured data (e.g., freeform text), structured data such as table data, and one or more graphical representations of data. In accordance with aspects of the present disclosure, the table ingestion pipeline 300 (depicted more fully in FIG. 3), which is configured to ingest table data in the input documents, and the graphics ingestion pipeline 400 (depicted more fully in FIG. 4), which is configured to ingest graphical data in the input documents, are part of the QA system ingestion pipeline 520. As described further below, the QA system ingestion pipeline 520 (including the graphics ingestion pipeline 400) enables the QA system 500 to utilize both structured and/or unstructured data along with graphical data to answer various questions using the QA system QA pipeline 504.

In accordance with aspects of the present disclosure, the QA system QA pipeline 504 is a computer application that is configured to mine the knowledge base created by the QA system ingestion pipeline 520 in order to provide an answer to a question 502. In the depicted example, the QA system QA pipeline 504 includes a question analysis module 506, a corpus search module 508, an answer generation module 510, an answer ranking module 512, and a display module 514.

The question analysis module 506 may include instructions for NLP, decomposition, shallow parses, deep parses, logical forms, semantic role labels, coreference, relations (e.g., subject-verb-object predicates or semantic relationships between entities), named entities, and so on, as well as specific kinds of analysis for question classification such as extracting the keynote words from the question. NLP enables the QA system 500 to understand human speech. Question classification is the task of identifying question types or parts of questions that require special processing.

In accordance with aspects of the present disclosure, the corpus search module 508 is configured to extract table annotations (e.g., annotation type, canonical name, or any auxiliary semantic value that was associated with the header or cell data) that correspond to the extracted keynote words or other data associated with the question 502. In accordance with aspects of the present disclosure, the corpus search module 508 uses the table annotations and returns possible matches.

In accordance with aspects of the present disclosure, assuming that at least two sets of table annotations are returned by the corpus search module 508, the answer generation module 510 is configured to apply two methods to the table annotations to identify one or more possible/candidate answers. The first method is referred to herein as a looping cells position mapping and folding method. The looping cells position mapping and folding method brings together at least two sets of table annotations to map the cell data to its position and then intersect it with the other to match the answer. In addition, the looping cells position mapping and folding method may be expanded as needed by folding in (i.e., adding) other sets of table annotations one at a time to retrieve additional data for answering more complex questions. In accordance with aspects of the present disclosure, the looping cells position mapping and folding method may use table annotations from more than one table. For example, one table may provide a list of the most traveled to city in the United States, while another table may identify tourist attractions for a particular city. Examples of the looping cells position mapping and folding method is further described below in connection with FIG. 8 and FIG. 9.

The second method is referred to herein as a curve fitting with graph axes intersection and folding method that may be used to infer the answer when no matching can be done at the cell level. For example, when there is no text mentioning that Barack Obama was president in 2011, but a table shows that he was president from 2008 to 2012, then some embodiments may correctly infer the answer by analyzing the table data using the curve fitting with graph axes intersection and folding method. An example of the curve fitting with graph axes intersection and folding method is further described below in connection with FIG. 10.

In accordance with aspects of the present disclosure, once the answer generation module 510 identifies one or more candidate answers, the answer ranking module 512 is configured to rank the one or more candidate answers. The answer ranking module 512 may rank the candidate answers based on a plurality of scores associated with each candidate answer. For example, IBM® Watson® employs more than 50 scoring components that produce scores ranging from formal probabilities to counts to categorical features, based on evidence from different types of sources including unstructured text, semi-structured text, and triple stores. These scorers consider various factors including, but not limited to, the degree of match between a passage's predicate-argument structure and the question, passage source reliability, geospatial location, temporal relationships, taxonomic classification, the lexical and semantic relations the candidate is known to participate in, the candidate's correlation with question terms, its popularity (or obscurity), and its aliases. Based on the rankings, the answer ranking module 512 may be configured to identify a single best-candidate answer to generate an answer to the question 502. In accordance with aspects of the present disclosure, the answer ranking module 512 may be configured to provide an estimate of its confidence (e.g., a confidence score/percentage) that the answer is correct.

In accordance with aspects of the present disclosure, the display module 514 is configured to display the answer, and optionally the confidence score. The display module 514 may convert the answer to speech for providing an audible verbal answer to the question 502. In accordance with aspects of the present disclosure, the display module 514 may be communicatively coupled to and/or integrated with the user interface module 432 (depicted in FIG. 4).

Figure 6:
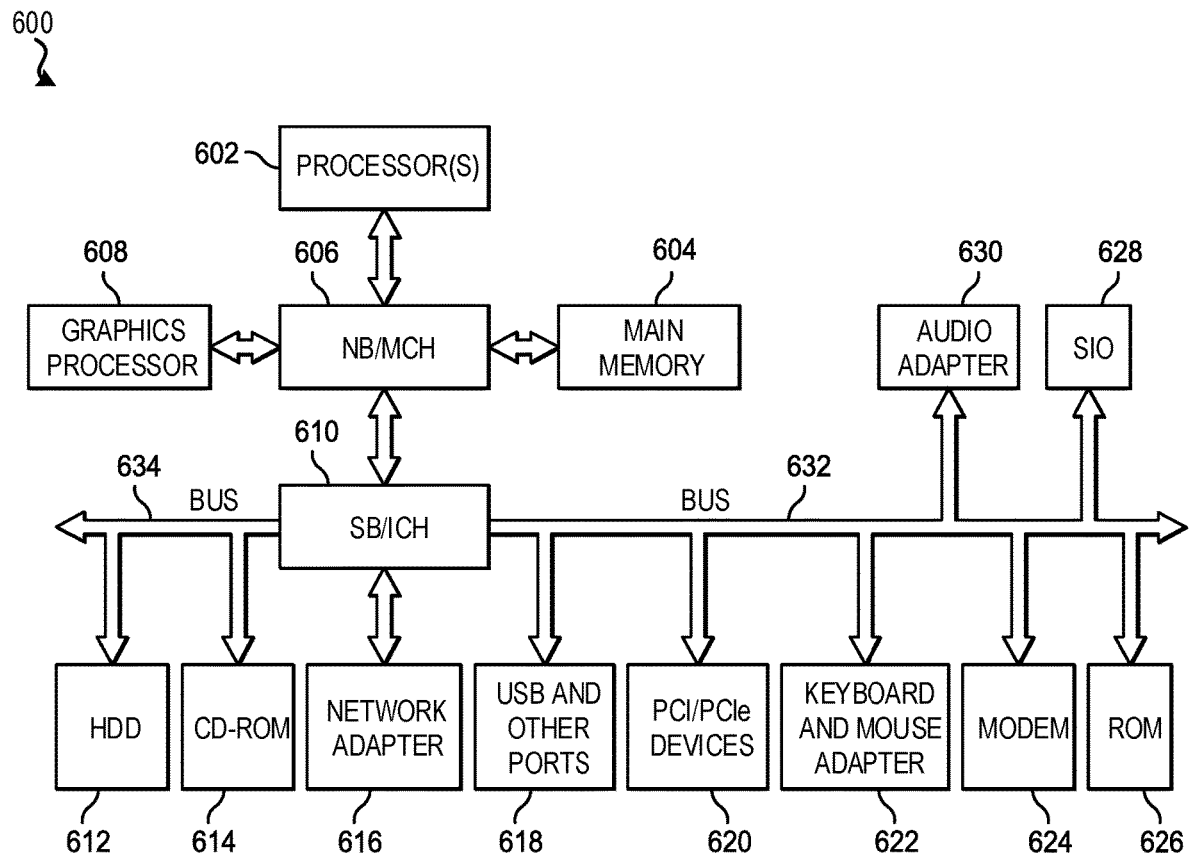
FIG. 6 is a block diagram illustrating a hardware architecture of a data processing system in accordance with aspects of the present disclosure.

FIG. 6 is a block diagram illustrating a hardware architecture of a data processing system 600 in accordance with aspects of the present disclosure. In accordance with aspects of the present disclosure, the QA system 500 (depicted in FIG. 5) may be implemented using the data processing system 600. Additionally, the data processing system 600 may be configured to store and execute instructions for performing the method 700 (depicted in FIG. 7A and FIG. 7B) as well as the other processes described herein. In the depicted example, the data processing system 600 employs a hub architecture including north bridge and memory controller hub (NB/MCH) 606 and south bridge and input/output (I/O) controller hub (SB/ICH) 610. Processor(s) 602, main memory 604, and graphics processor 608 are connected to NB/MCH 606. Graphics processor 608 may be connected to NB/MCH 606 through an accelerated graphics port (AGP). A computer bus, such as bus 632 or bus 634, may be implemented using any type of communication fabric or architecture that provides for a transfer of data between different components or devices attached to the fabric or architecture.

In the depicted example, network adapter 616 connects to SB/ICH 610. Audio adapter 630, keyboard and mouse adapter 622, modem 624, read-only memory (ROM) 626, hard disk drive (HDD) 612, compact disk read-only memory (CD-ROM) drive 614, universal serial bus (USB) ports and other communication ports 618, and peripheral component interconnect/peripheral component interconnect express (PCI/PCIe) devices 620 connect to SB/ICH 610 through bus 632 and bus 634. PCI/PCIe devices may include, for example, Ethernet adapters, add-in cards, and personal computing (PC) cards for notebook computers. PCI uses a card bus controller, while PCIe does not. ROM 626 may be, for example, a flash basic input/output system (BIOS). Modem 624 or network adapter 616 may be used to transmit and receive data over a network.

HDD 612 and CD-ROM drive 614 connect to SB/ICH 610 through bus 634. HDD 612 and CD-ROM drive 614 may use, for example, an integrated drive electronics (IDE) or serial advanced technology attachment (SATA) interface. In accordance with aspects of the present disclosure, HDD 612 may be replaced by other forms of data storage devices including, but not limited to, solid-state drives (SSDs). A super I/O (SIO) device 628 may be connected to SB/ICH 610. SIO device 628 may be a chip on the motherboard that is configured to assist in performing less demanding controller functions for the SB/ICH 610 such as controlling a printer port, controlling a fan, and/or controlling the small light emitting diodes (LEDS) of the data processing system 600.

The data processing system 600 may include a single processor 602 or may include a plurality of processors 602. Additionally, processor(s) 602 may have multiple cores. In accordance with aspects of the present disclosure, data processing system 600 may employ a large number of processors 602 that include hundreds or thousands of processor cores. In accordance with aspects of the present disclosure, the processors 602 may be configured to perform a set of coordinated computations in parallel.

An operating system is executed on the data processing system 600 using the processor(s) 602. The operating system coordinates and provides control of various components within the data processing system 600 in FIG. 6. Various applications and services may run in conjunction with the operating system. Instructions for the operating system, applications, and other data are located on storage devices, such as one or more HDD 612, and may be loaded into main memory 604 for execution by processor(s) 602. In accordance with aspects of the present disclosure, additional instructions or data may be stored on one or more external devices. The processes described herein for the illustrative embodiments may be performed by processor(s) 602 using computer usable program code, which may be located in a memory such as, for example, main memory 604, ROM 626, or in one or more peripheral devices.

Figure 7A:
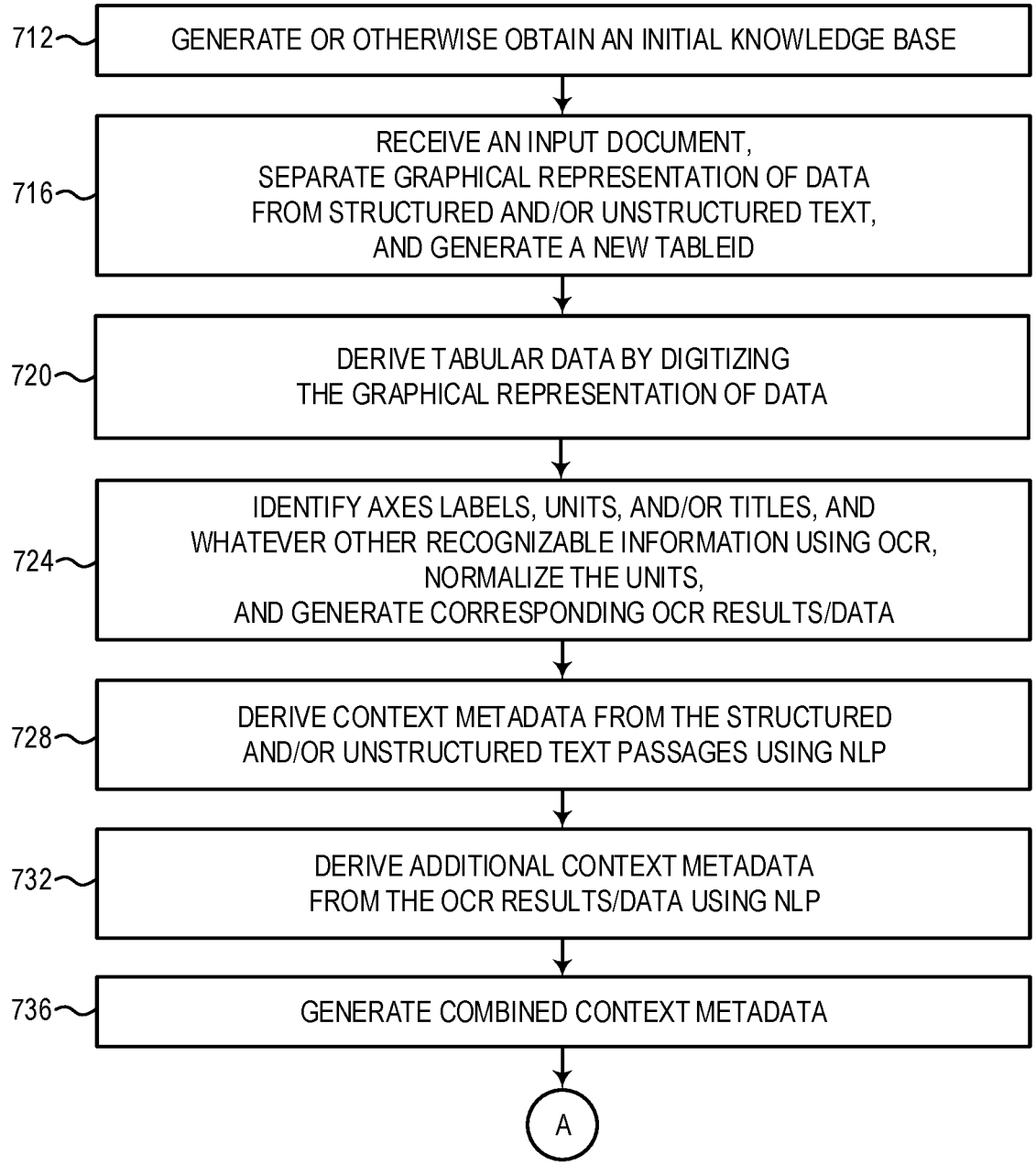
FIG. 7A and FIG. 7B are a flowchart illustrating a computer-implemented method for utilizing graphical data in accordance with aspects of the present disclosure.
Figure 7B:
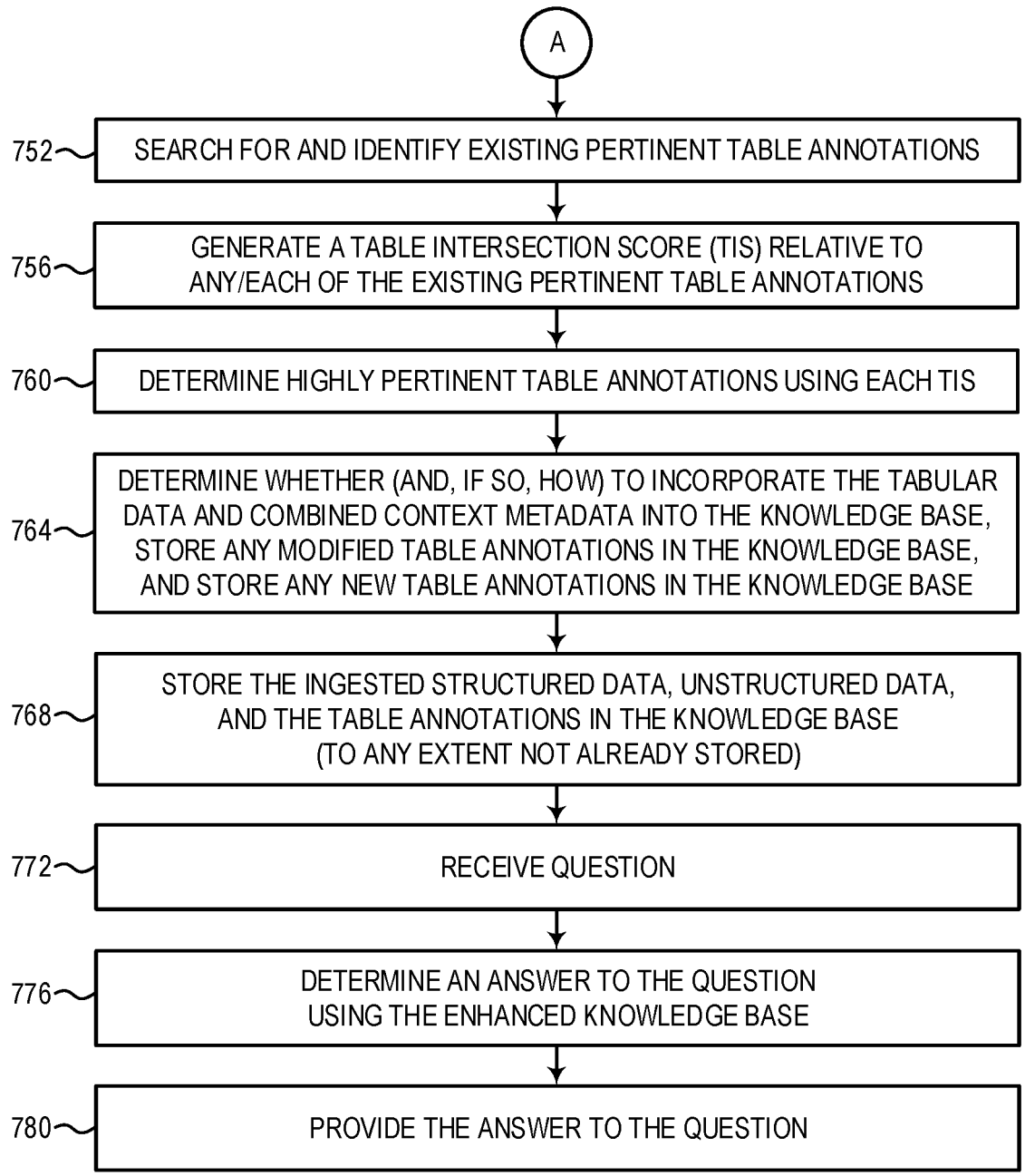

FIG. 7A and FIG. 7B are a flowchart illustrating a computer-implemented method 700 for utilizing graphical data in accordance with aspects of the present disclosure. In accordance with aspects of the present disclosure, the method 700 may be performed by the QA system 500 (depicted in FIG. 5). While the following description of the method 700 is made with reference to operations and components of the QA system 500, which includes the table ingestion pipeline 300 (depicted in FIG. 3; see also FIG. 5) and the graphics ingestion pipeline 400 (depicted in FIG. 4; see also FIG. 5), it should be appreciated that the method 700 and/or any one or more of the particular steps of the method 700 may be performed by any other suitable device or system.

At step 712, the QA system 500 generates or otherwise obtains an initial knowledge base. Generating the initial knowledge base may include ingesting initial input documents that include structured data and/or unstructured data. In accordance with aspects of the present disclosure, the structured data includes table data and the QA system 500 uses the table ingestion pipeline 300 to ingest the table data, to generate the table annotations 380, and to store the table annotations 380 in the data store module 390. The QA system 500 may obtain the initial input documents from a document training database, publicly available online sources, and/or various other sources. In accordance with aspects of the present disclosure, the QA system 500 may otherwise obtain the initial knowledge base by downloading or copying a previously generated knowledge base.

At step 716, the graphics extractor module 412 of the QA system 500 receives an input document that contains a graphical representation of data, separates the graphical representation of data from the associated structured and/or unstructured text passages of the input document, and generates a new unique table identifier (TableID).

At step 720, the graphics digitizer module 424 of the QA system 500 receives the graphical representation of data from the graphics extractor module 412 and digitizes the graphical representation of data to derive tabular data corresponding to the graphical representation of data.

At step 724, the OCR module 416 of the QA system 500 receives the graphical representation of data from the graphics extractor module 412, uses OCR to identify whatever axes labels, units, and/or titles, and whatever other information that is optically recognizable from the graphical representation of data, normalizes the units, and generates corresponding OCR results/data (including the normalized units) that describes or otherwise represents the optically recognizable information.

At step 728, the NLP module 420 of the QA system 500 receives the structured and/or unstructured text passages from the graphics extractor module 412 and uses NLP to derive, from the structured and/or unstructured text passages, context metadata, in the form of a list (such as, for example: {Watersports, Weather, Location} or {Housing Market, Price}) that describes the topics and/or other contexts of the graphical representation of data. In accordance with aspects of the present disclosure, still at step 728, the NLP module 420 reduces or expands each of the context metadata items into a canonical (normalized) form (before including it in the list) that accounts for variations such as plural/singular terms, past/present tense, misspellings, abbreviations, over-complexity, etc.

At step 732, the NLP module 420 of the QA system 500 receives the OCR results/data from the OCR module 416 and uses NLP to derive, from the OCR results/data, additional context metadata, in the form of a list (such as, for example: {Watersports, Weather, Location} or {Housing Market, Price}) that describes some topics and/or other contexts of the graphical representation of data. In accordance with aspects of the present disclosure, still at step 732, the NLP module 420 reduces or expands each of the additional context metadata items into a canonical (normalized) form (before including it in the list) that accounts for variations such as plural/singular terms, past/present tense, misspellings, abbreviations, over-complexity, etc.

At step 736, the NLP module 420 of the QA system 500 generates, by combining the context metadata that it has derived from the structured and/or unstructured text passages with the additional context metadata that it has derived from the OCR results/data, combined context metadata, in the form of a list (such as, for example: {Watersports, Weather, Location} or {Housing Market, Price}) that describes the topics and/or other contexts of the graphical representation of data.

At step 752, the table constructor module 428 of the QA system 500 receives the combined context metadata from the NLP module 420 and uses NLP techniques to search for and identify any existing "pertinent" table annotations from the knowledge base that include metadata, attributes, and/or similar information related to the combined context metadata. In accordance with aspects of the present disclosure, such pertinent table annotations may include one or more of the table annotations 380 that have already been generated and stored in the knowledge base by previous operations of the table ingestion pipeline 300 and/or one or more of the table annotations that have already been generated and stored in the knowledge base by previous operations of the graphics ingestion pipeline 400. For example, when the combined context metadata includes the terms "Watersports," "Weather," and "Location" (indicating that the NLP module 420 has determined that the graphical representation of data is somehow related to water sports, weather, and a location), the table constructor module 428 identifies any table annotations in the knowledge base that have the terms "Watersports," "Weather," and/or "Location" as their respective AnnotationType 108 and/or that include these terms in their respective Auxiliary Data 114. Note that the Auxiliary Data 114 may be a separate field containing a list of these metadata terms. In accordance with aspects of the present disclosure, one can choose first to add an extra field associated with the TableID that contains a list of common metadata terms for the entire table, and use that first for finding related tables, then second, use the dedicated Auxiliary Data 114 for a particular header to extract the list of metadata terms associated with a particular header within the table, and use those for second TIS generation process. In accordance with aspects of the present disclosure, in addition to applying NLP techniques, the table constructor module 428 also uses one or more supplemental relationship specifications ("domain adaptation schemas")—that the table constructor module 428 obtains from the source of domain adaptation schemas 436—to search for and identify any such pertinent table annotations. In accordance with aspects of the present disclosure, the domain adaptation schemas may be user-specified. For example, the user 408 may specify that "Swimming" is related to "Weather" and, accordingly, even when the NLP techniques applied by the table constructor module 428 do not identify table annotations including "Weather" as pertinent to combined context metadata including "Swimming," in view of the relationship provided by the domain adaptation schema, the table constructor module 428 nevertheless identifies such table annotations as pertinent. In accordance with aspects of the present disclosure, the domain adaptation schemas may be provided by one or more machine learning engines. For example, for the housing market domain, machine learning engines may learn that entities and facts such as war, building education or any development facilities, crime rates, etc. affect a house price (going up or down) in those regions. And, accordingly, such machine learning engines may develop domain adaptation schemas for specific regions, tracing and relating those factors as acceptable headers/data into the table annotations for the housing market domain.

At step 756, the table constructor module 428 generates a table intersection score (TIS) for each of the pertinent table annotations (identified by the table constructor module 428, at step 752) by comparing (and, more particularly, by intersecting) the combined context metadata (generated by the NLP module 420, at step 736) with the metadata, attributes, and/or similar information in each of the respective pertinent table annotations. For example, when the combined context metadata is {Desert, Rainfall, Location, Weather, Sandstorm, Windspeed, Month}, for a pertinent table annotation including the terms "Desert," "Rainfall," "Location," "Weather," "Sandstorm," "Windspeed," and "Month," the table constructor module 428 generates a TIS of 7, for a pertinent table annotation including only the terms "Rainfall," "Location," "Weather," "Sandstorm," "Windspeed," and "Month," the table constructor module 428 generates a TIS of 6, for a pertinent table annotation including only the terms "Location," "Sandstorm," and "Month," the table constructor module 428 generates a TIS of 3, for a pertinent table annotation including only the term "Windspeed," the table constructor module 428 generates a TIS of 1, and for a pertinent table annotation including only the terms "Camel," "Animal," and "Circus," the table constructor module 428 generates a TIS of 0. In accordance with aspects of the present disclosure, still at step 756, the generation of each TIS by the table constructor module 428 may also include the application of one or more domain adaptation schemas that provide additional data and/or one or more additional relationships for determining the TIS. For example, the user 408 may specify that "Swimming" is related to "Weather," such that when the combined context metadata is {Desert, Rainfall, Location, Weather, Sandstorm, Windspeed, Month}, for a pertinent table annotation including only the terms "Location" and "Swimming," the table constructor module 428 nevertheless generates a TIS of 2 (which is the result of intersecting the combined context metadata plus the domain adaptation schema relationship/information with the table annotation information) rather than merely a TIS of 1.

At step 760, the table constructor module 428 uses each TIS (generated by the table constructor module 428, at step 756) to determine which (if any) of the corresponding pertinent table annotations (identified by the table constructor module 428, at step 752) are "highly pertinent" to the tabular data (generated by the graphics digitizer module 424, at step 720). In accordance with aspects of the present disclosure, the table constructor module 428 makes these determinations by comparing each TIS to a common threshold number. For example, the threshold number may be 5 and, thus, the table constructor module 428 may decide that each of the pertinent table annotations that correspond to a TIS greater than or equal to 5 is/are highly pertinent. In accordance with aspects of the present disclosure, the threshold number may be a preset, fixed number. In accordance with aspects of the present disclosure, the threshold number may be a modifiable, user-input number.

At step 764, the table constructor module 428 determines whether to incorporate the tabular data (generated by the graphics digitizer module 424, at step 720) and the combined context metadata (generated by the NLP module 420, at step 736) into the knowledge base of the QA system 500 and (if the tabular data and the combined context metadata are to be incorporated into the knowledge base) how to incorporate them into the knowledge base. In accordance with aspects of the present disclosure, these determinations may include the table constructor module 428 generating user output data representing the highly pertinent table annotations, each corresponding TIS, the tabular data, and/or all or part of the combined context metadata, and prompting the user 408 (via the user interface module 432) for input, commands, instructions, etc. as to whether to incorporate the tabular data and the combined context metadata into the knowledge base and, if so, whether to incorporate them into particular ones of the highly pertinent table annotations in a "dimensionally non-expansive" manner, whether to incorporate them into particular ones of the highly pertinent table annotations in a "dimensionally expansive" manner, and/or whether to incorporate them into totally new table annotations for the knowledge base, and may further include the table constructor module 428 receiving responses, commands, instructions, etc. from the user 408 and proceeding accordingly. In accordance with aspects of the present disclosure, the table constructor module 428 may automatically determine (without instructions from the user 408) whether to incorporate the tabular data and the combined context metadata into particular ones of the highly pertinent table annotations in a "dimensionally non-expansive" manner, whether to incorporate the tabular data and the combined context metadata into particular ones of the highly pertinent table annotations in a "dimensionally expansive" manner, and/or whether to incorporate the tabular data and the combined context metadata into totally new table annotations for the knowledge base. As used herein, dimensionally non-expansive means consistent with being in the same virtual n-dimensional Euclidean space that is already represented by the particular set of highly pertinent table annotations, whereas, as used herein, dimensionally expansive means consistent with being in a higher order virtual n-dimensional Euclidean space than the virtual n-dimensional Euclidean space that is already represented by the particular set of highly pertinent table annotations.

In accordance with aspects of the present disclosure, still at step 764, the table constructor module 428 determines whether to incorporate the tabular data and the combined context metadata into each of the highly pertinent table annotations in a dimensionally non-expansive manner, and whether to incorporate the tabular data and the combined context metadata into each of the highly pertinent table annotations in a dimensionally expansive manner, by comparing the canonical axes labels (derived by the NLP module 420, at step 732) to each of the CanonicalName 110 (i.e., the canonical form of the column or row header data for the table that is represented by the respective highly pertinent table annotations). In accordance with aspects of the present disclosure, when each of the canonical axes labels is identical to a respective CanonicalName 110 of a particular set of highly pertinent table annotations, the table constructor module 428 incorporates the tabular data and the combined context metadata into the corresponding highly pertinent table annotations in a dimensionally non-expansive manner and stores the resulting modified table annotations back into the knowledge base (with/under their same TableID 102). For example, when the canonical axes labels are "Rainfall" and "Month" and a set of highly pertinent table annotations includes "Rainfall" as a CanonicalName 110 corresponding to a data column and includes "Month" as a CanonicalName 110 corresponding to another data column, the table constructor module 428 adds the portion of the tabular data regarding Rainfall to the Rainfall column data of the corresponding set of highly pertinent table annotations, adds the portion of the tabular data regarding Month to the Month column data of that same corresponding set of highly pertinent table annotations, adds the remaining combined context metadata to the Auxiliary Data 114, and stores the resulting modified table annotations back into the knowledge base (with/under their same TableID 102). It should be appreciated, then, that in such cases, the table constructor module 428 does not expand the virtual n-dimensional Euclidean space represented by the particular set of highly pertinent table annotations (in the example: Monthly Rainfall, Rainfall each Month, Rainfall versus Month, etc.); instead, the table constructor module 428 adds data to the preexisting table annotations (within the same virtual n-dimensional Euclidean space).

In accordance with aspects of the present disclosure, still at step 764, the determinations (by the table constructor module 428) of whether to incorporate the tabular data and the combined context metadata into each of the highly pertinent table annotations in a dimensionally non-expansive manner may also include the application of one or more domain adaptation schemas that provide additional data and/or one or more additional relationships for making the determination. For example, the user 408 may specify "Air Temperature" as a function of "Altitude" (e.g., AirTemp=0.2*Altitude+25) and, thus, when the canonical axes labels (derived from the graphical representation of data) are "Altitude" and "Humidity" and a set of highly pertinent table annotations includes "AirTemp" as a CanonicalName 110 corresponding to a data column and includes "Humidity" as a CanonicalName 110 corresponding to another data column, the table constructor module 428 converts the portion of the tabular data regarding Altitude to AirTemp according to the user-provided domain adaptation schema (i.e., AirTemp=0.2*Altitude+25), adds the resulting AirTemp data to the AirTemp column data of the corresponding set of highly pertinent table annotations, adds the portion of the tabular data regarding Humidity to the Humidity column data of that same corresponding set of highly pertinent table annotations, adds the remaining combined context metadata to the Auxiliary Data 114, and stores the resulting modified table annotations back into the knowledge base (with/under their same TableID 102).

On the other hand, in accordance with aspects of the present disclosure, still at step 764, when only one or more (but not all) of the canonical axes labels are identical to the respective one or more CanonicalName 110 of a particular set of highly pertinent table annotations, the table constructor module 428 incorporates the tabular data and the combined context metadata into the corresponding highly pertinent table annotations in a dimensionally expansive manner and stores the resulting modified table annotations back into the knowledge base (with/under their same TableID 102). For example, when the canonical axes labels are "Rainfall" and "Month" and a set of highly pertinent table annotations includes "Rainfall" as a CanonicalName 110 corresponding to a data column and includes "Altitude" as a CanonicalName 110 corresponding to another data column, the table constructor module 428 adds the portion of the tabular data regarding Rainfall to the Rainfall column data of the corresponding set of highly pertinent table annotations but adds the portion of the tabular data regarding Month to that same corresponding set of highly pertinent table annotations as data representing a new, additional column linked to a corresponding new, additional CanonicalName 110 of "Month," adds the remaining combined context metadata to the Auxiliary Data 114, and stores the resulting modified table annotations back into the knowledge base (with/under their same TableID 102). It should be appreciated, then, that in such cases, the table constructor module 428 expands the virtual n-dimensional Euclidean space previously represented by the particular set of highly pertinent table annotations into a higher order virtual n-dimensional Euclidean space (in the example the space is expanded into: Monthly Rainfall at each Altitude, Rainfall each Month at each Altitude, Rainfall versus Month versus Altitude, etc.). Further, it should be appreciated that the present disclosure relates graphical data to table data in a virtual n-dimensional Euclidean space of a question answer system knowledge base. It should also be appreciated that aspects of the present disclosure use graphical data to expand a virtual n-dimensional Euclidean space represented by table annotations in a question answer system knowledge base.

In accordance with aspects of the present disclosure, still at step 764, the determinations (by the table constructor module 428) of whether to incorporate the tabular data and the combined context metadata into each of the highly pertinent table annotations in a dimensionally expansive manner may also include the application of one or more domain adaptation schemas that provide additional data and/or one or more additional relationships for making the determination. For example, the user 408 may specify "Water Temperature" as a function of "Ocean Depth" (e.g., WaterTemp=[(−0.3)*Depth+15]) and, thus, when the canonical axes labels (derived from the graphical representation of data) are "Salinity" and "Depth" and a set of highly pertinent table annotations includes "PlanktonConcentration" as a CanonicalName 110 corresponding to a data column and includes "WaterTemp" as a CanonicalName 110 corresponding to another data column, the table constructor module 428 applies the user-provided domain adaptation schema to generate WaterTemp data from the Depth data portion of the tabular data (i.e., WaterTemp=[(−0.3)*Depth+15]), adds the resulting new data regarding WaterTemp to the WaterTemp column data of the corresponding set of highly pertinent table annotations, adds the portion of the tabular data regarding Salinity to that same corresponding set of highly pertinent table annotations as data representing a new, additional column linked to a corresponding new, additional CanonicalName 110 of "Salinity," adds the portion of the tabular data regarding Depth to that same corresponding set of highly pertinent table annotations as data representing a new, additional column linked to a corresponding new, additional CanonicalName 110 of "Depth," adds the remaining combined context metadata to the Auxiliary Data 114, and stores the resulting modified table annotations back into the knowledge base (with/under their same TableID 102). It should be appreciated, then, that in this example case, the table constructor module 428 expands the virtual 2-dimensional Euclidean space previously represented by the particular set of highly pertinent table annotations into a virtual 4-dimensional Euclidean space (in this example the space is expanded from [PlanktonConcentration versus WaterTemp] into [PlanktonConcentration versus WaterTemp versus Salinity versus Depth]).

In accordance with aspects of the present disclosure, still at step 764, when none of the canonical axes labels are identical to any CanonicalName 110 of a particular set of highly pertinent table annotations (and no domain adaptation schema applies to provide any other suitable relationship), the table constructor module 428 incorporates the tabular data and the combined context metadata into a set of totally new table annotations and stores the new table annotations in the knowledge base (with/under a new TableID 102). For example, when the canonical axes labels (derived from the graphical representation of data) are "Rainfall" and "Month" and a set of highly pertinent table annotations includes "Temperature" as a CanonicalName 110 corresponding to a data column and includes "Altitude" as a CanonicalName 110 corresponding to another data column, but no highly pertinent table annotations include Rainfall and Month and no domain adaptation schema relates Rainfall or Month to Temperature or Altitude, the table constructor module 428 generates a totally new set of table annotations (which include "Rainfall" as a CanonicalName 110 linked to the corresponding temperature data portion of the tabular data and "Month" as a CanonicalName 110 linked to the corresponding altitude data portion of the tabular data; which include an appropriate selection from the combined context metadata as an AnnotationType 108; and which include the remaining combined context metadata as Auxiliary Data 114) and the table constructor module 428 stores these new table annotations in the knowledge base (with/under a new TableID 102).

At step 768, the QA system 500 stores the ingested structured data, unstructured data, and the table annotations in the knowledge base (to any extent that they have not already been stored in the knowledge base). Storing the ingested structured data, unstructured data, and the table annotations in the knowledge base produces an enhanced knowledge base that enables integration of document-level search across structured data with unstructured data into a single information retrieval or QA system.

At step 772, the QA system 500 receives the question 502.

At step 776, the QA system 500 determines an answer to the question 502 using the enhanced knowledge base. In accordance with aspects of the present disclosure, determining the answer may include analyzing table data using at least one of two methods: a looping cells position mapping and folding method (described below in connection with FIG. 8 and FIG. 9), and a curve fitting with graph axes intersection and folding method (described below in connection with FIG. 10). As described below, the looping cells position mapping and folding method is configured to loop through each cell data of a first table annotation until a keynote words search match is found, record a cell position number of a cell matching the keynote words search, and retrieve data in a corresponding cell position number from a second table annotation. The looping cells position mapping and folding method may fold in additional table annotations as needed to answer more complex questions. The curve fitting with graph axes intersection and folding method may be used to determine answers that may or may not be directly found in the knowledge base/table data by plotting either a data cell position or a data cell content value to determine a function that is used to determine the answer. These methods may be combined with the results of a search of the unstructured data in the knowledge base. The present disclosure further enables structured data annotations at the term and position level within a document for passage-level information retrieval. The answer from the structured data consolidates with the answer from unstructured data to increase the accuracy of the answer. Additionally, the aspects of the present disclosure may be configured to return answers in the form of a list or table.

At step 780, the QA system 500 provides the answer (determined at step 776) via the display module 514.

Figure 8:
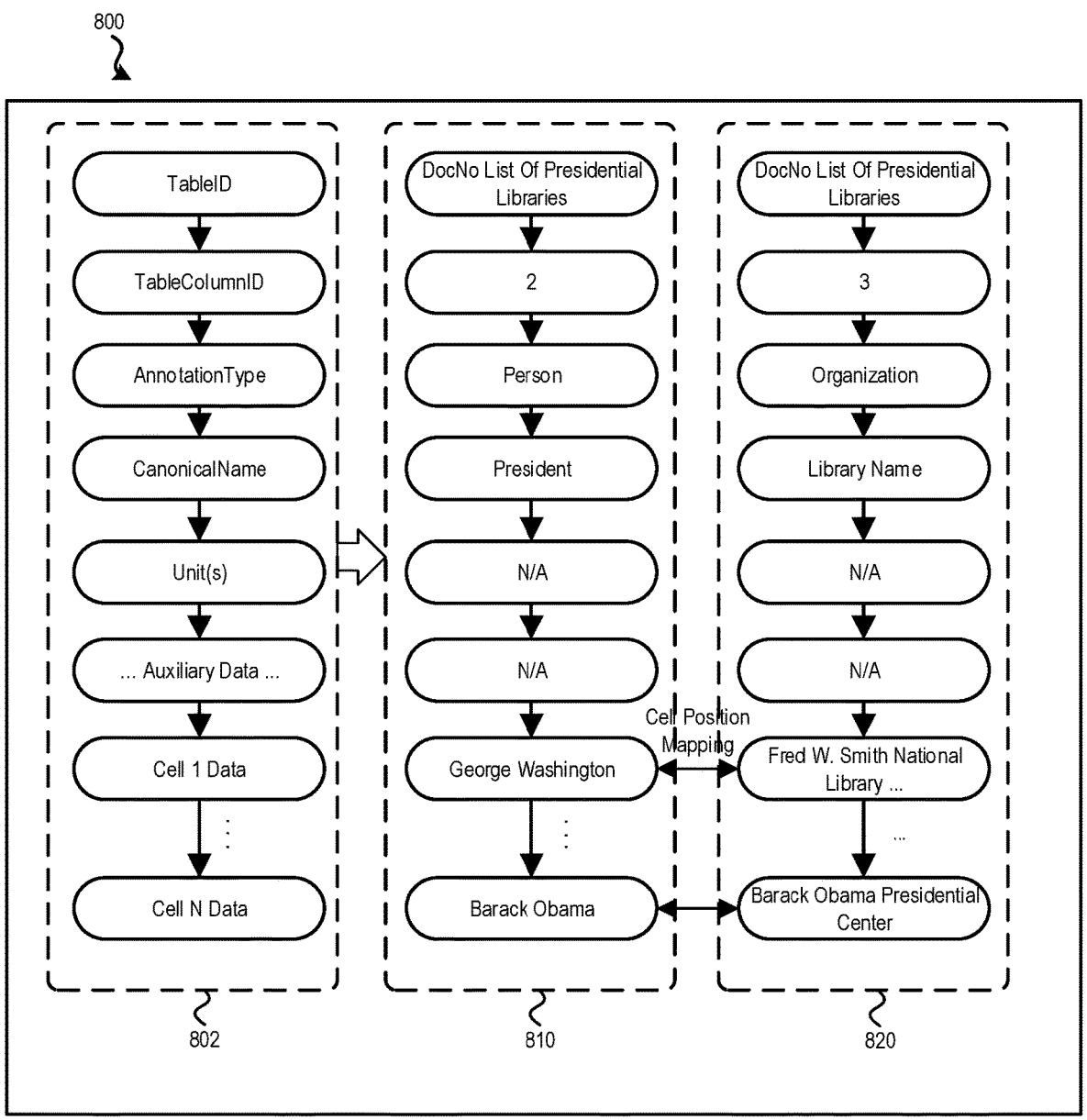
FIG. 8 is a block diagram illustrating a first example of table annotations in which a looping cells position mapping and folding method may be applied to determine an answer in accordance with aspects of the present disclosure.

FIG. 8 is a block diagram illustrating a first example of table annotations 800 in which a looping cells position mapping and folding method may be applied to determine an answer in accordance with some embodiments of the present disclosure. The looping cells position mapping and folding method may be performed by the QA system 500 (depicted in FIG. 5). The table annotations 800 illustrate generic table annotations 802 for a database (similar to the table annotations 100 depicted in FIG. 1), for a presidential library table that is included in a Presidential Library Wikipedia page (https://en.wikipedia.org/wiki/Presidential_library).

The table annotations 800 also depict the specific table annotations for column 2 (table annotation 810) and column 3 (table annotation 820) of the presidential library table. The presidential library table has the following column headers (not all expressly shown in FIG. 8): "No.", "President", "Library name", "Location", Operated By", "Image", and "Logo/Website." The table annotation 810 has a TableID of DocNo List Of Presidential Libraries, TableColumnID is 2 for the second column, AnnotationType is Person, CanonicalName is President, there is no Unit(s) or Auxiliary data associated with this column, Cell 1 Data for column 2 is George Washington, [remaining cell data from cell 2 to cell N−1 for column 2], and Cell N Data for column 2 is Barack Obama. The table annotation 820 has a TableID of DocNo List Of Presidential Libraries, TableColumnID is 3 for the third column, AnnotationType is Organization, CanonicalName is Library name, there is no Unit(s) or Auxiliary data associated with this column, Cell 1 Data for column 3 is Fred W. Smith national library, [remaining cell data from cell 2 to cell N−1 for column 3], and Cell N Data is Barack Obama Presidential center for column 3.

To answer a question about a Presidential Library for a particular President (e.g., "What is the name of Presidential Library of President Lincoln?), the looping cells position mapping and folding method starts with one table annotation (e.g., table annotation 810) and loops through each cell data until it finds the match that was part of the keynote words search (e.g., Lincoln). The looping cells position mapping and folding method records the cell position number of the cell matching the keynote words search. The looping cells position mapping and folding method then retrieves data in the corresponding cell position from the table annotation for the column containing the Presidential Library name (table annotation 820) to identify the answer. The looping cells position mapping and folding method does not require that the entire table data be search or retrieved. Instead, the looping cells position mapping and folding method only performs searching using one table annotation at a time thus conserving resources and increasing search efficiency.

The folding step of the looping cells position mapping and folding method occurs when more than two sets of table annotations are present. For example, assume the question is "What US Presidents were Democrats and what Libraries did they create?" To answer the question, the looping cells position mapping and folding method begins by looping through the table annotations for the "President" column, and then checking each President's corresponding Party affiliation from a second table annotation for the "Party" affiliation column using the cell position matching the "President" column, as well as the "Library name" column using the third table annotation (assuming there is a table with all these columns) for the same cell position number. In accordance with aspects of the present disclosure, when the "Party" affiliation column indicates that the President is a Democrat and the "Library name" column indicates a library name, then all three cells data for President, Party, and Library are added to a list. The looping cells position mapping and folding method repeats until exhausting the table; then returns the 3-fold list as the answer. Once the cell position is determined, additional data from other columns in the table may be added one column at a time to answer even more complex questions. As an analogy, the looping cells position mapping and folding method may be visualized as opening a hand-held folding fan one section at a time, where the head/pivot of the fan is the TableID, the stick is the HeaderID, the Leaf/Rib is the Cell No. X, and the answer is the Leaf/Rib (Cell No.) level.

Figure 9:
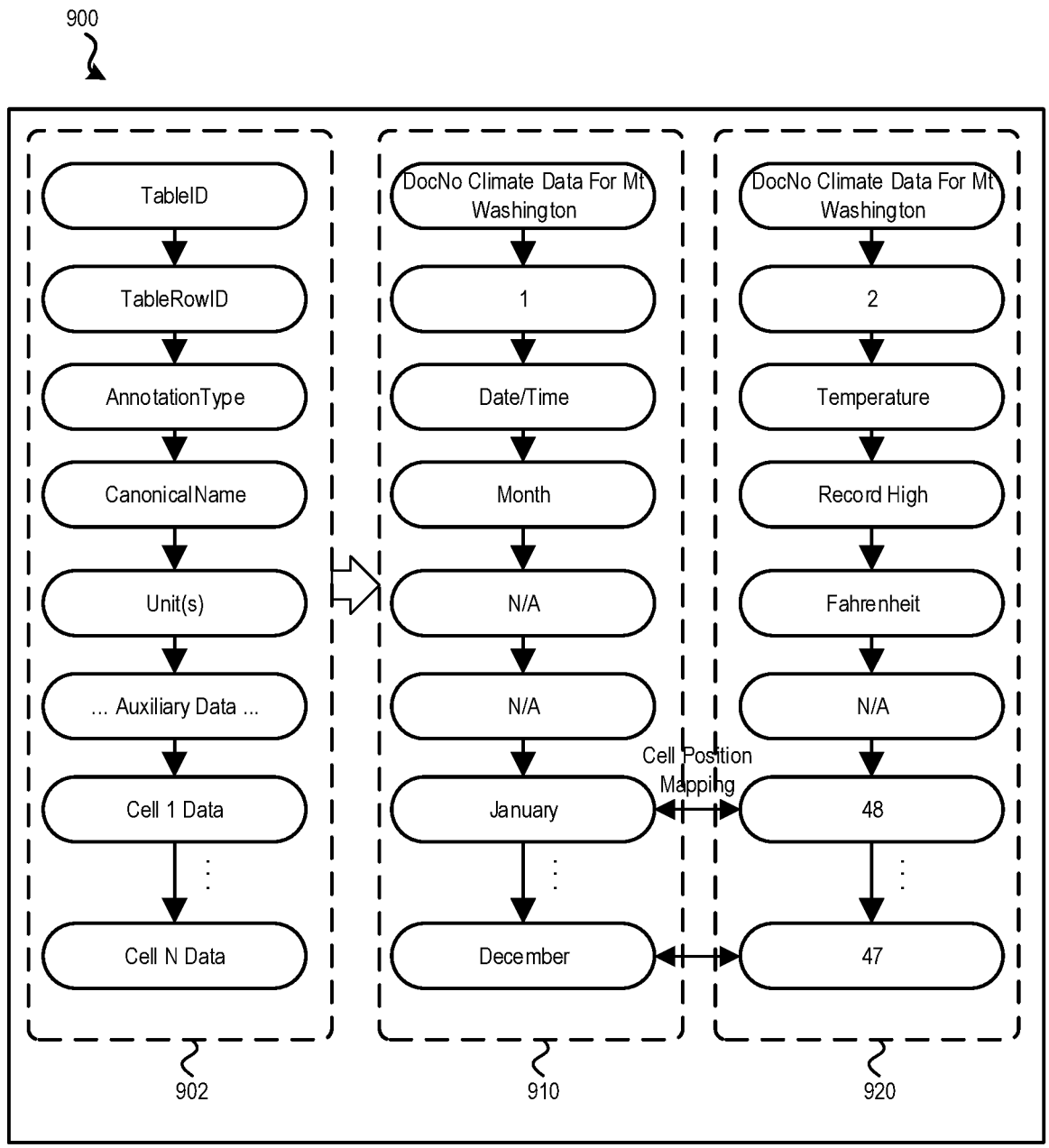
FIG. 9 is a block diagram illustrating a second example of table annotations in which a looping cells position mapping and folding method may be applied to determine an answer in accordance with aspects of the present disclosure.

FIG. 9 is a block diagram illustrating a second example of table annotations 900 in which a looping cells position mapping and folding method may be applied to determine an answer in accordance with aspects of the present disclosure. Again, the looping cells position mapping and folding method may be performed by the QA system 500 (depicted in FIG. 5). The table annotations 900 illustrate generic table annotation 902 for a database, as depicted in FIG. 1, for a Wikipedia Alpine Climate table that is included in a Wikipedia Alpine Climate table (https://en.wikipedia.org/wiki/Alpine_climate).

The table annotations 900 also depict the specific table annotations for row 1 (table annotation 910) and row 2 (table annotation 920) of the Wikipedia Alpine Climate table. The table annotation 910 has a TableID of DocNo Climate Data For Mt Washington, TableRowID is 1 for the first row, AnnotationType is Date/Time, CanonicalName is Month, there is no Unit(s) or Auxiliary data associated with this row, Cell 1 Data for row 1 is January, [remaining cell data from cell 2 to cell N−1 for row 1], and Cell N Data for row 1 is December. The table annotation 920 has a TableID of DocNo Climate Data For Mt Washington, TableRowID is 2 for the second row, AnnotationType is Temperature, CanonicalName is Record High, the Unit(s) is Fahrenheit, there is no Auxiliary data associated with this row, Cell 1 Data for row 2 is 48, [remaining cell data from cell 2 to cell N−1 for row 2], and Cell N Data is 47 for row 2.

To answer the question "Which month or months have the record high temperature on Mt. Washington?", the looping cells position mapping and folding method starts by looping from each cell data of the Record High/Temperature Table Annotation 920, and recording at each step the highest temperature. The looping cells position mapping and folding method then uses the cell positions (corresponding to the record high temperature cell position) to retrieve the answer(s) from the Month Table Annotation 910.

In some embodiments, the looping cells position mapping and folding method (depicted in FIG. 8 and FIG. 9) requires that a normalized (standard) cell position is maintained within the table. For example, in one implementation, the cells data are kept in order for its corresponding header (column or row). Alternatively, in accordance with aspects of the present disclosure, a normalized cell position may be added as an attribute. A normalized position means a standard position taken by the implementation such that the relative position of any cell is maintained within the table.

Figure 10:
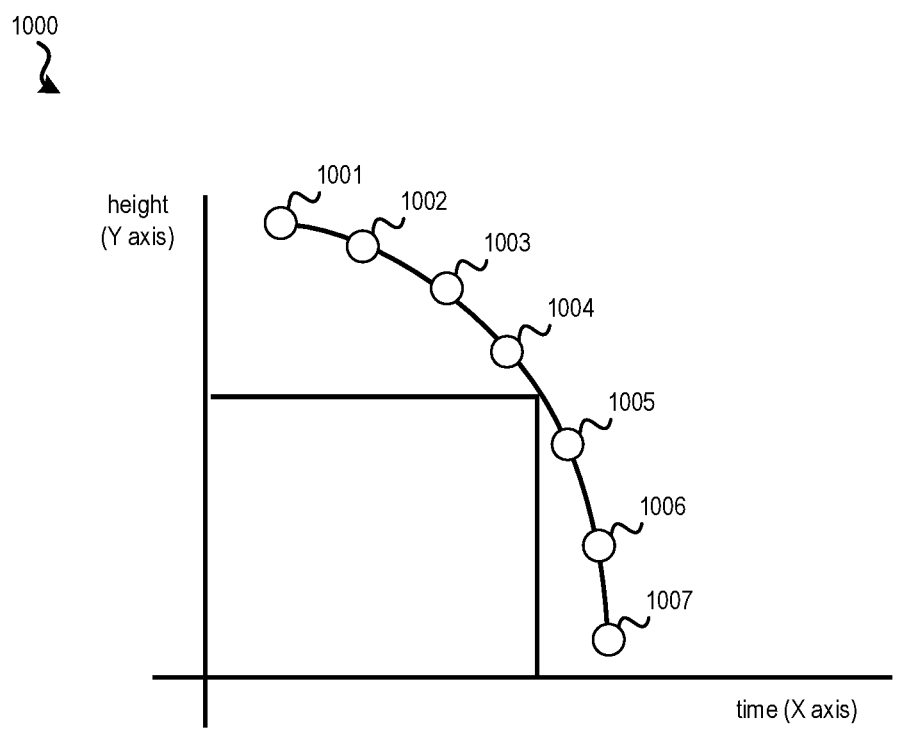
FIG. 10 is graph illustrating a curve fitting with graph axes intersection and folding method in accordance with aspects of the present disclosure.

FIG. 10 is graph 1000 that illustrates a curve fitting with graph axes intersection and folding method in accordance with aspects of the present disclosure. In accordance with aspects of the present disclosure, the QA system 500 (depicted in FIG. 5) may also apply the curve fitting with graph axes intersection and folding method to determine answers that are not directly found in the table data. In the depicted example, the graph 1000 may be used to answer the question "How far does an object fall in the first xx seconds?" In the example, the curve fitting with graph axes intersection and folding method is given a table with seven measurement points 1001-1007 indicating the height of the object at seven different times in seconds as it falls. The specific xx seconds asked in the question is not in the table data (i.e., not one of the seven measurement points 1001-1007). Thus, to answer this question, the QA system plots the data cell content value (i.e., measurement points 1001-1007) against the vertical position of the object (i.e., "height") (Y axis) and time (X axis). The QA system may then apply the curve fitting with graph axes intersection and folding method to extract a function, $Y_i=f(X_i)$, based on the given data points. The QA system may then plug in xx (i.e., the specific time referenced in the question) into the function to determine Y (i.e., height of object at time xx) as the answer. Thus, by using the curve fitting with graph axes intersection and folding method, the disclosed embodiments are able to provide answers to questions where the answer is not directly found in the table data or knowledge base.

Additionally, the curve fitting with graph axes intersection and folding method may be used for non-numerical data, such as, but not limited to, the string data presented in the Presidential Libraries table in the above examples. For example, to apply the curve fitting with graph axes intersection and folding method to non-numerical data, the QA system maps the string to its cell positions. The data cell positions (i.e. numerical values) are then plotted on X and Y axes. The curve fitting method is then applied to determine a function of a function of X and Y, which may then be used to solve for an unknown X or Y value.

Similar to the looping cells position mapping and folding method, the folding step in the curve fitting with graph axes intersection and folding method occurs when more than two sets of table annotations are involved/retrieved. In accordance with aspects of the present disclosure, the curve fitting with graph axes intersection and folding method works with two sets of the table annotations at a time and uses their result together with the next table annotation. For example, the curve fitting with graph axes intersection and folding method may keep the X axis in place and replace Y axis data with the next table annotations, and then compute the result as described above. The process is repeated for each additional table annotation until all table annotations are consumed, thus folding them one at a time until consumed.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In accordance with aspects of the present disclosure, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented method, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. Further, the steps of the methods described herein may be carried out in any suitable order, or simultaneously where appropriate. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for handling a graphical representation of data associated with a question answering (QA) input document, the method comprising:
   receiving the QA input document;
   processing the QA input document through a QA system ingestion pipeline to extract data from the QA input document, wherein the QA ingestion pipeline comprises a table ingestion pipeline for extracting first data from a table in the QA input document and a graphics ingestion pipeline for extracting second data from the graphical representation of data, wherein the graphical representation of the data is depicted in one of a chart or a graph;
   deriving, at least from a portion of the QA input document, first metadata regarding a context of the graphical representation of data;
   deriving, at least from a portion of the graphical representation of data, tabular data;
   determining, at least in part by comparing at least a portion of the first metadata to existing table annotations from a QA knowledge base, how to incorporate the tabular data into the QA knowledge base; and
   storing the tabular data in the QA knowledge base.

2. The method of claim 1, wherein determining how to incorporate the tabular data into the QA knowledge base includes a step selected from the group consisting of determining whether to incorporate at least a portion of the tabular data into the existing table annotations and determining whether to incorporate at least a portion of the tabular data into new table annotations for the QA knowledge base.

3. The method of claim 2, wherein comparing at least the portion of the first metadata to the existing table annotations includes generating a comparison result, determining whether to incorporate at least the portion of the tabular data into the existing table annotations includes determining whether to incorporate at least the portion of the tabular data into the existing table annotations based at least in part on the comparison result, and determining whether to incorporate at least the portion of the tabular data into the new table annotations includes determining whether to incorporate at least the portion of the tabular data into the new table annotations based at least in part on the comparison result.

4. The method of claim 3, wherein comparing the at least a portion of the first metadata to the existing table annotations includes intersecting at least the portion of the first metadata with the existing table annotations.

5. The method of claim 3, wherein deriving the first metadata includes deriving a first portion of the first metadata using natural language processing.

6. The method of claim 5, wherein deriving the first metadata further includes deriving intermediate data from the graphical representation of data using optical character recognition, and deriving the first metadata further includes deriving a second portion of the first metadata from the intermediate data using natural language processing.

7. The method of claim 6, further comprising incorporating the tabular data into the existing table annotations.

8. The method of claim 7, further comprising incorporating the intermediate data into the existing table annotations.

9. The method of claim 6, further comprising:
generating the new table annotations based at least in part on the intermediate data and the tabular data; and
storing the new table annotations in the QA knowledge base.

10. The method of claim 3, further comprising:
generating a user output indicative of the comparison result; and
receiving a user input,
wherein determining whether to incorporate at least the portion of the tabular data into the existing table annotations includes determining whether to incorporate at least the portion of the tabular data into the existing table annotations based at least in part on the user input, and determining whether to incorporate at least the portion of the tabular data into the new table annotations includes determining whether to incorporate at least the portion of the tabular data into the new table annotations based at least in part on the user input.

11. A system for handling a graphical representation of data associated with a question answering (QA) input document, the system comprising:
a memory having instructions therein; and
at least one processor in communication with the memory, wherein the at least one processor is configured to execute the instructions to:
receive the QA input document;
process the QA input document through a QA system ingestion pipeline to extract data from the QA input document, wherein the QA ingestion pipeline comprises a table ingestion pipeline for extracting first data from a table in the QA input document and a graphics ingestion pipeline for extracting second data from the graphical representation of data, wherein the graphical representation of the data is depicted in one of a chart or a graph;
derive, at least from a portion of the QA input document, first metadata regarding a context of the graphical representation of data,
derive, at least from a portion of the graphical representation of data, tabular data,
determine, at least in part by comparing at least a portion of the first metadata to existing table annotations from a QA knowledge base, how to incorporate the tabular data into the QA knowledge base, and
store the tabular data in the QA knowledge base.

12. The system of claim 11, wherein the at least one processor is further configured to execute the instructions to determine, at least in part by comparing at least the portion of the first metadata to the existing table annotations, whether to incorporate at least the portion of the tabular data into the existing table annotations and whether to incorporate at least the portion of the tabular data into new table annotations for the QA knowledge base.

13. The system of claim 12, wherein the at least one processor is further configured to execute the instructions to derive a first portion of the first metadata using natural language processing.

14. The system of claim 13, wherein the at least one processor is further configured to execute the instructions to derive intermediate data from the graphical representation of data using optical character recognition, and the at least one processor is further configured to execute the instructions to derive a second portion of the first metadata from the intermediate data using natural language processing.

15. The system of claim 14, wherein the at least one processor is further configured to execute the instructions to incorporate the tabular data and the intermediate data into the existing table annotations.

16. A computer program product for handling a graphical representation of data associated with a question answering (QA) input document, the computer program product comprising a computer readable storage medium having program instructions embodied therewith, the program instructions executable by at least one processor to cause the at least one processor to:
receive the QA input document;
process the QA input document through a QA system ingestion pipeline to extract data from the QA input document, wherein the QA ingestion pipeline comprises a table ingestion pipeline for extracting first data from a table in the QA input document and a graphics ingestion pipeline for extracting second data from the graphical representation of data, wherein the graphical representation of the data is depicted in one of a chart or a graph;
derive, at least from a portion of the QA input document, first metadata regarding a context of the graphical representation of data,
derive, at least from a portion of the graphical representation of data, tabular data,
determine, at least in part by comparing at least a portion of the first metadata to existing table annotations from a QA knowledge base, how to incorporate the tabular data into the QA knowledge base, and
store the tabular data in the QA knowledge base.

17. The computer program product of claim 16, wherein the program instructions are further executable by the at least one processor to cause the at least one processor to determine, at least in part by comparing at least the portion of the first metadata to the existing table annotations, whether to incorporate at least a portion of the tabular data into the existing table annotations and whether to incorporate at least a portion of the tabular data into new table annotations for the QA knowledge base.

18. The computer program product of claim 17, wherein the program instructions are further executable by the at least one processor to cause the at least one processor to derive a first portion of the first metadata using natural language processing.

19. The computer program product of claim 18, wherein the program instructions are further executable by the at least one processor to cause the at least one processor to derive intermediate data from the graphical representation of data using optical character recognition, and the at least one processor is further configured to execute the instructions to derive a second portion of the first metadata from the intermediate data using natural language processing.

20. The computer program product of claim 19, wherein the program instructions are further executable by the at least one processor to cause the at least one processor to incorporate the tabular data and the intermediate data into the existing table annotations.

* * * * *